US007835853B2

(12) United States Patent
Taniguchi et al.

(10) Patent No.: US 7,835,853 B2
(45) Date of Patent: Nov. 16, 2010

(54) VEHICLE DETECTION SYSTEM

(75) Inventors: Yuichi Taniguchi, Osaka (JP); Hideaki Shiranaga, Osaka (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 823 days.

(21) Appl. No.: 10/546,301

(22) PCT Filed: Feb. 13, 2004

(86) PCT No.: PCT/JP2004/001598

§ 371 (c)(1),
(2), (4) Date: Jul. 17, 2006

(87) PCT Pub. No.: WO2004/083897

PCT Pub. Date: Sep. 30, 2004

(65) Prior Publication Data

US 2006/0250279 A1    Nov. 9, 2006

(30) Foreign Application Priority Data

Feb. 19, 2003    (JP) .............................. 2003-041722

(51) Int. Cl.
*G06G 7/76*    (2006.01)
*G08G 1/00*    (2006.01)
(52) U.S. Cl. .................... 701/117; 701/70; 340/933; 342/27; 342/28; 342/114
(58) Field of Classification Search ................ 340/933; 701/70, 117; 342/27, 28, 114
See application file for complete search history.

(56) References Cited

U.S. PATENT DOCUMENTS 3,222,637 A * 12/1965  Gray .......................... 340/938

(Continued)

FOREIGN PATENT DOCUMENTS

JP                60-78373 A        5/1985

(Continued)

OTHER PUBLICATIONS

International Preliminary Report on Patentability issued in International Application No. PCT/JP2004/001598, dated Nov. 23, 2006.

(Continued)

*Primary Examiner*—Khoi Tran
*Assistant Examiner*—Jorge O Peche
(74) *Attorney, Agent, or Firm*—McDermott Will & Emery LLP

(57) ABSTRACT

A vehicle detection system is provided for detecting vehicles with high precision recognition with less misdetection and less electricity consumption, the installation of the vehicle detection system causing less damage to a town's aesthetic beauty. Vehicle detection is determined by processing an input level value provided from a sensor that detects infrared radiation irradiated from an object to be detected, and the vehicle presence judgment is carried out by calculating a background level value based on an input level value detected from infrared radiation during "absence of a vehicle", and by comparing the value based on a difference between the input level value (comparative value) by a data processing unit. By using the sensor that passively detects infrared radiation, the system consumes less electricity, and maintains its accuracy of detection even if detection is performed sideways of vehicles.

12 Claims, 19 Drawing Sheets

U.S. PATENT DOCUMENTS

| | | | | |
|---|---|---|---|---|
| 3,355,707 A | * | 11/1967 | Koerner | 340/938 |
| 3,675,195 A | * | 7/1972 | Iwamoto et al. | 340/941 |
| 3,818,430 A | * | 6/1974 | Williams | 340/941 |
| 3,870,990 A | * | 3/1975 | Fathauer | 340/939 |
| 4,225,786 A | * | 9/1980 | Perlman | 250/342 |
| 4,232,285 A | * | 11/1980 | Narbaits-Jaureguy et al. | 340/941 |
| 5,339,081 A | * | 8/1994 | Jefferis et al. | 342/28 |
| 5,714,754 A | * | 2/1998 | Nicholas | 250/221 |
| 5,742,438 A | * | 4/1998 | Conner et al. | 359/743 |
| 5,892,226 A | * | 4/1999 | Robinson et al. | 250/338.3 |
| 6,229,455 B1 | * | 5/2001 | Yost et al. | 340/943 |
| 6,246,956 B1 | * | 6/2001 | Miyoshi et al. | 701/117 |
| 6,501,865 B1 | * | 12/2002 | Tanaka et al. | 382/312 |
| 6,525,673 B1 | * | 2/2003 | Feldman | 340/928 |
| 6,587,778 B2 | * | 7/2003 | Stallard et al. | 701/117 |
| 6,876,392 B1 | * | 4/2005 | Uomori et al. | 348/348 |

FOREIGN PATENT DOCUMENTS

| | | | |
|---|---|---|---|
| JP | 6-147999 A | | 5/1994 |
| JP | 7-282389 A | | 10/1995 |
| JP | 7-294664 A | | 11/1995 |
| JP | 8-164808 A | | 6/1996 |
| JP | 9-33662 A | | 2/1997 |
| JP | 09033662 A | * | 2/1997 |
| JP | 9-62822 A | | 3/1997 |
| JP | 9-113367 A | | 5/1997 |
| JP | 11-242795 | | 9/1999 |
| JP | 3068076 B1 | | 5/2000 |
| JP | 2000-215389 A | | 8/2000 |
| JP | 3207583 B2 | | 7/2001 |
| JP | 2001-304973 A | | 10/2001 |
| JP | 2001-330683 A | | 11/2001 |
| JP | 2003-242596 A | | 8/2003 |
| JP | 2003-317186 A | | 11/2003 |
| WO | WO 97/05507 | | 2/1997 |

OTHER PUBLICATIONS

Taiwanese Office Action, with English translation, issued in Taiwanese Patent Application No. 093103853, mailed Jul. 2, 2009.

* cited by examiner

"Presence of a vehicle"

"Absence of a vehicle"

------- Input level value
·—·—·— Background level
——— Calculation of an average value -·-·-·- Threshold value H
·········· Threshold value L
——— Comparison value "Presence of a vehicle"
"Absence of vehicle"

------ Input level value
------ Background level
——— Calculation of an average value ------ Threshold value H
············ Threshold value L
——— Comparison value Time →

← Detection direction

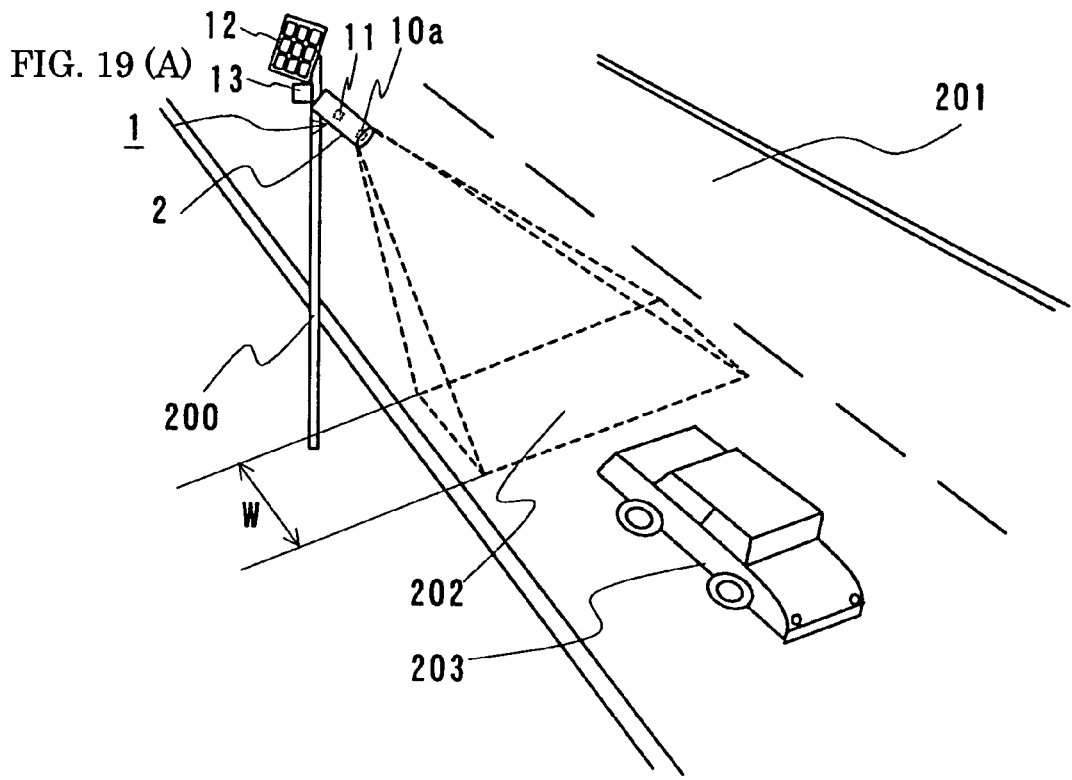
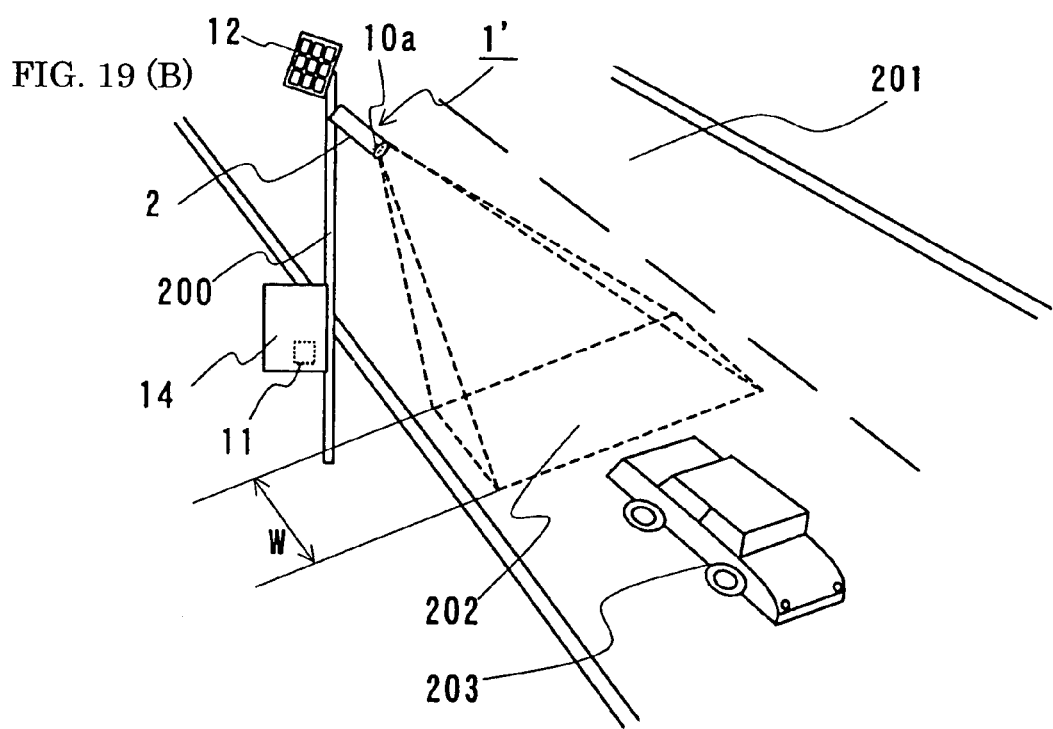

VEHICLE DETECTION SYSTEM

RELATED APPLICATION

This application is a U.S. national phase application of PCT international application PCT/JP2004/001598, filed on Feb. 13, 2004, which in turn claims the benefit of Japanese Application No. 2003-041722, filed on Feb. 19, 2003, the disclosure of which Applications are incorporated by reference herein.

TECHNICAL FIELD

The present invention relates to a vehicle detection system and a maintenance method thereof. Particularly, the present invention relates to a vehicle detection system and a maintenance method thereof, suitable for reducing misdetection by high precision vehicle detection with low electricity consumption, causing less damage to the town's aesthetic beauty.

BACKGROUND ART

Conventionally, a loop detector and an ultrasonic detector are well known vehicle detectors for determining traffic flow such as the amount of traffic or the occupation rate.

A loop detector detects a vehicle by a loop coil buried underground for sensing inductance change when a vehicle passes over the coil.

An ultrasonic detector generally uses a so-called active sensor for detecting the reflection of an ultrasound transmitted from its sensor such that the detector detects the difference between the arrival time of the ultrasound reflected from the vehicle and the road, respectively.

An example of such ultrasonic detector is described in Japanese Patent Application Laid-Open No. 60-78373 (refer to Claims).

Such conventional vehicle detectors have the following drawbacks.

Since the loop detector requires the coil to be buried underground, burying work is needed, and the detector might be inapplicable to a place, such as a bridge, etc. when it is difficult to secure an installation place.

On the other hand, an ultrasonic detector has drawbacks such as

① when the ultrasonic detector is equipped at the side of a road to preserve the aesthetic beauty of town, precision detection of a vehicle is difficult, and ② the cost of the detector tends to be high, because of its high power consumption.

(1) Generally, a transmitter/receiver of the ultrasonic detector must be set almost directly above a vehicle running on the road in order to enable an almost vertical transmission of ultrasound to the vehicle. Therefore, the ultrasonic detector is installed such that the transmitter/receiver fixed to an overhead horizontal bar supported by a pole set at the side of the road faces downward to the road and vehicles. The bar must be of sufficient length for the ultrasonic detector to be set directly above the center of the vehicles, which results in shortcoming that the horizontal bar supported by the pole and projected to a space above the center of the road is not only detrimental to scenic beauty of the town, but also needs high construction cost. In particular, the above described problems are remarkable in the case of installing plural vehicle detectors to cover plural traffic lanes on the road; a long overhead bar must be supported by two poles standing at both sides of the road.

To solve these problems, it is conceivable for the ultrasonic detectors to be installed a so-called "side-fire" configuration at a slanting incline position to the vehicles, in place of the position directly above the vehicles (i.e., so-called "right-above" installation), in order to eliminate or shorten the long overhead bar. However, the transmitter/receiver by the "side-fire" installation is set at a downward slant to the vehicles, and a misdetection of the vehicles may occur due to the effects of rain and wind, or multiplex reflection. Specifically, a case where an ultrasonic transducer vibrates its own vibration frequency when rain falls from a sideward direction, etc. and hits the ultrasonic transducer or a case where the detector receives a reflected multi-passed wave other than the reflected wave directly from the vehicles may be determined as "the present of a vehicle" by the sensor.

(2) Since the ultrasonic detector is an active sensor, electricity consumption tends to be high. Power for the ultrasonic detector is usually supplied through a cable.

Therefore, the ultrasonic detector becomes costly because cable connection for power supply is necessary and its high power consumption is high.

DISCLOSURE OF INVENTION

An object of the present invention is to provide a vehicle detection system suitable for detecting a vehicle with high precision recognition with less misdetection, in a manner less detrimental to the aesthetic beauty of the town, and with low electricity consumption. Another object of the present invention is to provide a suitable maintenance method for the vehicle detection system.

According to the present invention, the above object can be achieved by using a passive detection means for detecting infrared radiation.

According to the present invention, a vehicle detection system comprises (a) a sensor for detecting a vehicle passing through a monitoring range of the road by infrared radiation irradiated from an object to be detected, (b) a background level calculation means that defines the intensity of current infrared radiation detected by the sensor as an input level value, that defines a value based on the intensity of infrared radiation emitted by objects other than vehicles as a background level value, and that calculates and renews the background level value in accordance with environments on an as needed basis, and (c) a vehicle presence judgment means that defines a value based on the difference between the input level value and the background level value as a comparative value and that determines the presence of a vehicle when the comparative value exceeds a threshold value.

Since the method of the present invention employ a detector for detecting infrared radiation irradiated from the object to be detected, unlike conventional detectors that detect the reflection of infrared radiation transmitted by themselves, the misdetection of a vehicle can be reduced without being affected by the rain and wind even when the detector is disposed at a position not directly above the vehicles, but on the roadsides near the vehicles. The system of the present invention allows the detection of a vehicle to be performed from the side of vehicles with high precision.

As the system of the present invention uses a passive sensor to detect infrared radiation, it consumes less electricity compared with active sensors used in conventional ultrasonic detectors. Since power consumption of the ultrasonic detector is generally high, it is difficult to supply power to the detector by solar batteries; power must be supplied through a cable.

On the other hand, since the system of the present invention uses a passive sensor, and its power consumption is small even in continuous operation, electric power can be supplied with solar batteries.

Thus, the present invention achieves the reduction of power consumption and cost by using the passive sensor. The supply of electric power does not require a cable, which eliminates the need of cable construction for power supply. Furthermore, the system of the present invention allows intermittent operation of the sensor while maintaining its accuracy by using an infrared-ray-detecting sensor.

In particular, in the present invention, in order to detect the vehicle with high precision, it is desirable to use a thermopile as the passive sensor. The intensity of current infrared radiation detected by the sensor is defined as an input level value. On the other hand, the intensity of infrared radiation emitted by objects other than vehicles is defined as a background level value. The background level value is calculated and renewed in accordance with environments on an as needed basis by using a background level calculation means. Because the background level value obtained in accordance with environments on an as needed basis is compared with the input level value, the precision of the judgment on the presence or absence of the vehicle is increased.

BRIEF DESCRIPTION OF DRAWINGS

FIG. 13(A) shows input level values, background level values and judgment results.

FIG. 14(A) shows input level values, background level values and judgment results.

FIGS. 19(A) and (B) are schematic views showing the detector being installed at a pole set at the side of a road. FIG. 19(A) illustrates an example in which a sensor and a vehicle presence judgment means are formed in one body, and FIG. 19(B) illustrates an example in which a sensor and a vehicle presence judgment means are set separately.

Figure 1:
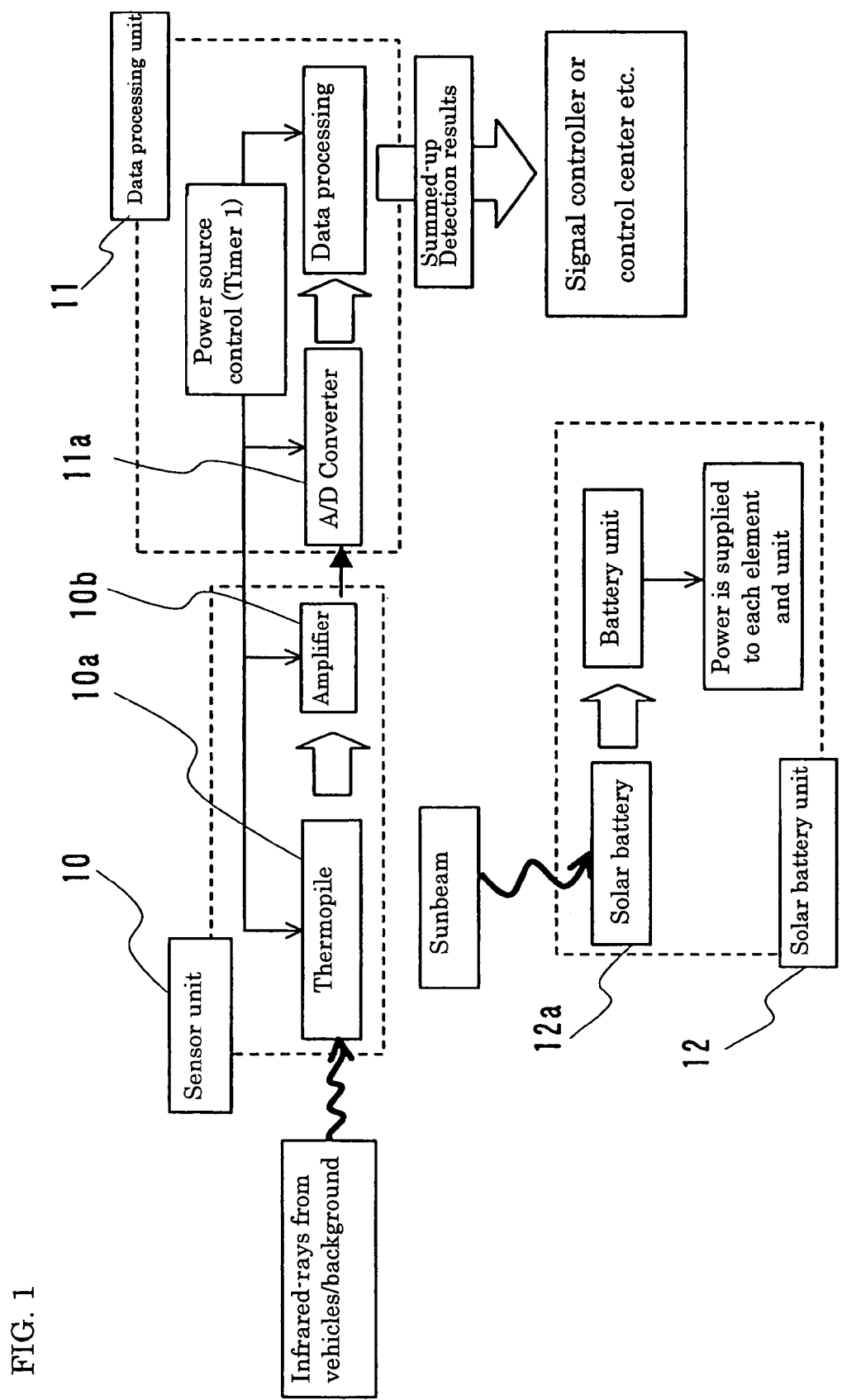
FIG. 1 is a functional block diagram illustrating a vehicle detection system of the present invention in the case in which a sensor operates intermittently by a timer controller and summed-up detected results are transmitted through a cable.

The following numbers described in the specification or figures are defined below:

1, 1' and 1": Detectors
2: A housing box
3: A cover
4: An aiming unit
4a: A concave projection
4b: A convex projection
5: A window
10: A sensor unit
10a: A thermopile
10b and 10c: Amplifiers
11: A data processing unit
11a: An A/D converter
11b: A D/A converter
12: A solar battery unit
12a: A solar battery
13: A radio communication unit
13a: A radio control unit
13b: A transmission/Reception unit
14: A control box
15: A base plate
15': A CPU substrate
16: An infrared transparent lens
17: A supporting unit
17a: A space
18: A screw
19: A lens holder
200: A supporting pole
201: A road
202: A monitoring range
203: A vehicle
204: A horizontal bar

BEST MODE FOR CARRYING OUT THE INVENTION

Intensity of the infrared radiation irradiated from an object is proportional to about the fourth power of absolute temperature of the object and to emissivity $\varepsilon$ of the object according to Stefan-Boltzmann's law. Therefore, an infrared-radiation-detecting sensor is directed toward the road surface can detect a vehicle running on the road by the change of intensity of detected infrared radiation when the temperature or the emissivity of the vehicle is different from that of the road.

According to the present invention, a sensor for detecting infrared radiation is a so-called passive sensor that does not detect infrared radiation transmitted by the detector itself but detects infrared radiation irradiated from an object to be detected.

The sensor is preferably a sensor that can detect electrical changes due to the thermal effect of infrared radiation. It is particularly preferable for the sensor to use a thermopile in which the thermal change caused by infrared radiation at a thermocouple is output as a thermoelectromotive force.

According to the system of the present invention, using a thermopile having a high output capability of the thermoelectromotive force and/or designing a suitable circuit configuration and algorism as described later enables satisfactory detection of a vehicle by detecting infrared radiation, without using any other type of sensor such as a pyroelectric detector: only by means of the thermopile. The thermopile is particularly useful compared with the pyroelectric detector as described later because it can detect a vehicle that has stopped due to traffic jams.

In the case of a system of the present invention using a thermopile as a sensor, the basic circuit thereof includes the thermopile, an amplifier amplifying electromotive force generated in the thermopile, and a vehicles presence judgment means, for example CPU, which determines the presence of vehicles by using values read from an amplified voltage of the electromotive force. In this circuit, the amplifier conceivably amplifies not only direct current components but also alternative current components. The system may be structured to have plural amplifiers: an amplifier-A connected to the thermopile has a comparatively high amplification factor, and an amplifier-B connected to the vehicles presence judgment means has a comparatively low amplification factor, and the amplifier-B amplifies a differential between an output voltage of the amplifier-A and a reference voltage. By using such plural amplifiers and inputting the reference voltage into the amplifier-B, the dynamic range of the vehicles presence judgment means can be improved.

The sensor and the amplifier may be designed to operate intermittently. In this case, it is desirable to control the ON/OFF of a power source for the sensor and the amplifier by a timer. That is, the infrared radiation may be detected only when the sensor and the amplifier operate during a predetermined time periodically at a predetermined interval set by the timer.

The inventors have found that by the use of the thermopile, the presence of a_vehicle can be determined depending on the change of temperature as calculated by detecting the amount of the infrared radiation irradiated from an object to be detected. In order to calculate the temperature of the thermopile is necessary, since the thermoelectromotive force generated from the thermopile also depends upon the temperature of the thermopiles themselves. However, it is possible to determine the presence of a vehicle, by using an input level value obtained from a sensor such as the thermopile, as described below. Thus, by_applying the method of the present invention, vehicles are detectable based on the change in intensity of infrared radiation due to the change of emissivity, even in the case in which there is no temperature change.

In the system of the present invention, the vehicle presence judgment using an input level value provided from the sensor may be done by directly using the input level value, or by using a value calculated with an appropriate conversion based on the input level value. In the former case, a vehicle presence judgment means is, for example, a pattern matching means or a neural network means. In the latter case, the system may be structured such that the judgment made by is "presence of a vehicle", if a comparative value is larger than a threshold value, where the comparative value is a value based on a difference between an input level value and a background level value which is a value based on infrared radiation irradiated from the background other than the object to be detected.

In the case in which the vehicle presence judgment means uses a calculated value based on the input level value, the above-described sensor first passively detects infrared radiation. And if a value based on the difference between the input level value and the background level value is equal to or higher than the threshold value, the presence of a vehicle is recognized. Or if the value based on the difference between the input level value and the background level value is lower than the threshold value, the absence of a vehicle is recognized. Then, in the case where the background level value is fixed as a predetermined value as described later, the processing of the vehicle presence judgment means is completed after erasing the input level value, and so on. In the case where the background level value is designed to be variable, storage of input level values is done for use as the background level, and predetermined operation such as calculation is done if a calculated value is used as the background level value. The results of the judgment are transmitted to signal controllers or a control center.

The background level value used relative to the input level value in the above judgment as to the existence of a value is a value based on the intensity of infrared radiation irradiated from objects other than the vehicle. The background level value may be a given value (a set value) predetermined in each season and at specified times a day, for example, or may be a value based on values detected by a sensor such as the above described sensor or the thermistor provided for detecting the background level value. For example, the intensity of infrared radiation irradiated from the background other than vehicles is measured from time to time, and a value based on such value may be used as the background level value. As the background level value based on the measured value is similar to the value of actual circumstance, higher precision detection can be achieved. A value detected just before a judgment may be used as the background level value. However, if only a value obtained from one detection is used as the background level value, a misdetection of a vehicle presence may occur, because the background situation may change instantaneously in actual circumstances. Therefore, it is preferable to use a value which is calculated as the background level value by a calculation means for determining the background level value based on the intensity of the infrared radiation irradiated from the background other than vehicles. For example, the background level value may be an average value calculated based on the values saved as the results of detecting infrared radiation irradiated from objects other than vehicles at plural times. If a sensor of the same type is used for detecting the background level value and vehicles, it is unnecessary to provide a separate sensor for detecting the background level value.

A calculation value calculated by an exponential smoothing method might be used as the background level value. The exponential smoothing method is generally expressed as $f_0 = \alpha \times d_{-1} + (1-\alpha) f_{-1} = f_{-1} + \alpha \times (d_{-1} - f_{-1})$, and a previous level value (in this case an input level value) can be reflected in an expected value. ($f_0$: Next expected value, $\alpha$: Smoothing coefficient, $d_{-1}$: Previous actual value, $f_{-1}$: Previous expected value). Thus, the background level value can be more precise, being adjusted to the actual circumstances (road surface conditions). More specifically, the background level value is caused to follows an input level value at a slew rate determined by the smoothing coefficient $\alpha$. The smoothing coefficient $\alpha$ may be constant, but preferably it is changeable by the last result of the vehicle presence judgment so that the background level value can be determined more precisely without the effect of the intensity (temperature) of the infrared radiation irradiated from vehicles. For example, when the last result of the vehicle presence judgment was "presence of a vehicle", the current input level value is considered to be a value detected by infrared radiation irradiated from vehicles if it is a case of traffic jams. Since the background level value becomes an abnormal one if the slew rate is high during traffic jams, it is preferable for the slew rate to be relatively small or zero. That is, the smoothing coefficient $\alpha$ should be comparatively small or zero. Then, the background level value is nearly the same as the previous background level value with the previous actual value (an input level value, in this case) being substantially not reflected. On the other hand, when the last result of the vehicle presence judgment is "absence of a vehicle", the present input level value is considered to be a value detected by infrared radiation irradiated from a background other than vehicles, that is, from a road. Therefore, it is preferable to comparatively increase the slew rate, that is, to modify according to a previous actual value (the present input level value in the case) by comparatively increasing the smoothing coefficient $\alpha$.

In the present invention, in order to compare a value based on the difference between a background level value and an input level value with a threshold value, a difference between an input level value and a background level value may be used as it is, as a comparative value. However, the Inventors have found that if the difference between an input level value and a background level value is used directly as the comparative value, the vehicle presence judgment tends to result in determination as "absence of a vehicle" in the following cases:

1. Intensity of the infrared radiation changes moderately in traffic jams, etc; or
2. The input level value is the same intensity as the background level value due to big temperature change (intensity change of the infrared radiation) of a vehicle.

The Inventors have also found that in such cases:

1. It is effective to use an integrated value based on input level value detected during a predetermined time rather than an input level value detected instantaneously,
2. The use of the integrated value makes it possible to recognize an essential tendency in the change of intensity of infrared radiation, and
3. The detection of a vehicle can be made with higher precision.

Therefore, the inventors propose that an integrated value based on the difference between input level values and background level values obtained during a predetermined time be used as the value based on the difference of an input level value and the background level value.

The Inventors have found that it is preferable for a variation during a unit time adding to the difference between the input level value and the background level value. Therefore, the Inventors also propose that the variation also be taken into consideration as the comparison value. The variation, for example, may be the difference between the present input level value and the immediately proceeding input level value. However, it is more effective if the variation is the difference between the present input level value and a slightly earlier input level value: for example, 160 milliseconds (ms) before the present in the case of detecting the input level value every 10 ms. In addition, according to the variation the presence of a vehicle can easily be recognized as "presence of a vehicle" in the case where the input level value varies even if a small difference exists between the input level value and the background level value, since the variation is unaffected by the present circumstance, that is, the background level value is not calculated based on the present circumstances. Accordingly, as in the case described above, the misdetection of "absence of a vehicle" can be reduced. Such vehicle presence judgment using the comparison value may be made by two steps, for example: a first judgment is made based on the difference between the background level value and the input level value, and a second judgment is done according to the variation. Specifically, when a difference between the background level value and the input level value is higher than the threshold value, the judgment is "presence of a vehicle". When the difference is lower than the threshold value, the judgment is "absence of a vehicle". Thereafter, judgment is based on the variation. Thus, misdetection can be reduced, and more precise judgment of vehicle presence can be achieved.

Furthermore, it is more desirable that both the variation per unit time and the integrated value of differences between the input level values and the background level values obtained during predetermined time be used as the comparison values. When the above-mentioned integrated value is singularly used as the comparison value, the comparison value may become zero, but the "presence of a vehicle" can be determined easily by adopting the variation as long as the input level value varies. By applying the variation and the integrated value to the algorism of the vehicle presence judgment, the system of the present invention having only a thermopile can have the same or superior function as compared with a pyroelectric detector, even if no additional sensor such as a pyroelectric detector is provided.

The threshold value for the present invention may be a fixed value, but preferably it is changed according to actual circumstances. For example, when a change in the intensity of infrared radiation (temperature or emissivity change) is large, which means the dispersion of the intensity is large, that is, when the dispersion of the intensity is large, the threshold value may be set to be a comparatively large value. On the other hand, when the intensity change of infrared radiation (temperature or emissivity change) is small, the threshold value may be set to be a comparatively small value. These threshold values may be obtained by calculation. For example, the threshold value may be defined as a fixed value plus a modification value so that the threshold value may be changeable with changing the modification value. In this case, the modification value preferably is changed according to the change of the input level value. Moreover, the modification value is preferably changed according to the last result of the vehicle presence judgment to avoid a too large threshold value. For example, if the last result of the vehicle presence judgment was "presence of a vehicle", the modification value preferably is set to be comparatively small, and if the last result of vehicle presence judgment was "absence of a vehicle", the modification value preferably is set to be comparatively large. In this case, once the "presence of a vehicle" is recognized as the last judgment, the presence of a vehicle can be easily determined continuously: for example, when vehicles stop in traffic jams, etc., the judgment of the presence of a vehicle is maintained, and when the vehicles start to run, the judgment of the presence of a vehicle can easily be ceased depending on the situation.

When the state of the vehicles changes from being present to being absent, the judgment preferably is extended for some holding time. Since a vehicle has its own temperature distribution which causes variation in intensity distribution of infrared radiation, misdetection may occur: for example, one vehicle may be recognized as plural vehicles. Extending the holding time described above can effectively reduce such misdetection. Such modifications of the holding time are possible because the state of "absence of a vehicle" for only a very short time is unrealistic: for example, plural vehicles cannot run at comparatively short distances between cars at high speed. The holding time, for example, is about 115 ms.

The processing of background level values, comparison values, threshold values and judgment as to the presence of vehicles, etc. may be done by a known central processing unit (CPU) which is publicly known.

Results provided from the vehicle presence judgment means are summed up and transmitted to signal controllers or a control center. The results may be transmitted through wire or by radio with a radio transmission means provided in the system. In this case, it is preferable to provide a power source control unit for intermittently supplying electricity to the radio communication means for a predetermined duration so as to reduce the consumption of electric power. A power source control unit may be provided with a timer, for example, such that the summarized results are received and transmitted only when the power source is turned ON.

It is desirable to check whether a sensor and a vehicle presence judgment means are functioning normally in the system of the present invention, that is, to perform maintenance of the system. Such maintenance may be carried out by transmitting maintenance data from equipment such as a personal computer (PC), which is connected to the vehicle presence judgment means through a cable, etc., and by confirming the state of the data sent back to the equipment. However, in the case of maintenance using a cable, it is necessary to provide boxes or connectors for a cable system and connection work is needed. For reducing or eliminating installation of such equipment and connection work, maintenance preferably is done by radio. That is, the maintenance method of the vehicle detection system of the present invention is characterized in that the system is maintained by transmitting maintenance data to a radio communication means by radio. In such maintenance system by radio, it is preferable that a radio interface such as an IrDA in maintenance equipment such as a personal computer be provided.

Furthermore, for effective maintenance to be carried out even in the case of supplying power intermittently to the radio communication means, it is more desirable that a maintenance judgment unit be provided to determine whether maintenance data are received or not in the system. That is, it is preferable that the system is maintained by the following procedures:
1. When the radio communication means is turned ON, the maintenance judgment unit starts to operate and determines whether the maintenance data are received or not.
2. If the maintenance data are received, the maintenance is carried out.

When the power source for the radio communication means is turned ON, both the maintenance judgment unit and the transmission/reception unit may operate at the same time, or each unit may operate separately. In the former case, when the power source for the radio communication means is turned ON, the radio communication means receives maintenance data transmitted from the maintenance equipment, such as, a personal computer and transmits responding data to the equipment. On the other hand, if the radio communication means does not receive maintenance data, the radio communication means receives results from the vehicle presence judgment means and transmits them to signal controllers and a control center, etc.

In the latter case, there are two cases: the power source for a radio communication means is turned ON for the transmission/reception of the maintenance data: and the power source for a radio communication means is turned ON for the transmission of the maintenance data to signal controllers and so on.

Therefore, ON/OFF of the power source for the radio communication means may be controlled by a control unit such as a timer in each case.

The sensors in the system of the present invention may be provided in a so-called side-fire configuration at a supporting pole set at the side of a road such that the detection of infrared radiation is done from the roadside, that is, vehicles may be observed from the side of a road. Specifically, when a sensor is installed at a location equal to or higher than vehicles relative to the road surface, the sensor may be installed on a pole in a manner such that the sensor is directed downward to the vehicles and the road so that the vehicles can be observed from an upper inclining direction. When a sensor is installed at a position lower than vehicles' height and above the road surface, the sensor may be installed on a pole such that observation can be made in an approximately horizontally direction towards the vehicles.

When vehicles running on plural traffic lanes are detected, plural sensors corresponding to the number of traffic lanes are used. In the system of the present invention, one system having plural sensors in an integrated unit may be provided, or plural systems each having one sensor may be provided. In the former case, the sensor provided in one system of the present invention are installed in so-called side-fire configuration so as to shift on a pole set at the side of a road so that the plural vehicles at plural traffic lanes are detectable. In the latter case, for example, each sensor may be installed a so-called side-fire configuration on a pole set at the side of a road, shifting in a similar manner as in the former case. However, if a large vehicle runs on a side lane near the installation site of the sensors of the system and a small vehicle runs on a far side lane of the installation site of the sensors, infrared radiation irradiated from the small vehicle may be obstructed by the large vehicle. In order to avoid the above problem and to detect each vehicle running in each traffic lane, sensors may be installed at appropriate intervals on a horizontal bar which is supported by a pole set at the side of a road. In this case, since the sensors in the system of the present invention can satisfactorily detect vehicles even though the sensors are not placed approximately just above the center of the vehicles, the bar need not have such a long length as to allow the sensors to be installed at nearly the center of the vehicles; it may be comparatively short.

Since the system of the present invention uses a sensor that detects infrared radiation, it is possible to precisely detect vehicles even though the sensor is placed at a side position rather than approximately just above the vehicles running on a road. Since the system does not require a full-length horizontal bar, but a shorter one if needed, the beauty of the town is less damaged compared with a system using an ultrasonic detector which needs a longer horizontal bar.

Preferably, an infrared transparent lens directed to an object to be detected is provided in front of a sensor, such as a thermopile, in order to adjust the range of sensing infrared radiation and to easily focus the infrared radiation to the sensor. The infrared transparent lens has any shape as far as it is transparent to infrared radiation. For example, its one surface may be spherical. Particularly, the material of the infrared transparent lens is preferably made of zinc sulfide (ZnS). Germanium (Ge)-made lens that conventionally is known as an infrared transparent lens needs the addition of supplemental materials such as glass type or silicon type additives. As a result of research, the Inventors have found that since a ZnS lens has superior weatherability, the lens can be used in a state exposed to the outside. Based on the inventor's research, the present invention preferably uses a ZnS-made lens.

Also, it is preferable for the system of the present invention to have a box for housing a sensor such as thermopiles. Such box is preferably made of aluminum. The infrared transparent lens is placed in the box at a suitable position for focusing to the sensor such as thermopiles housed in the box. In this case, the sensor and infrared transparent lens may be supported integrally by one supporting means. In the case of the supporting the sensor and the infrared transparent lens by one supporting means, it is preferable to form the supporting structure such that the sensor and the lens are installed at appropriate positions with their focus distance adjusted. Such supporting unit formed in one body and having positions appropriately adjusted in terms of the focus distances for the sensor and the lens enables easy installation of the sensor and the lens in the box without need of focus adjustment work.

It is preferable that the box has an aiming means for adjusting a directional angle of an infrared transparent lens to the direction of an object because when the box having a sensor such as a thermopile and an infrared transparent lens is installed on a supporting pole, it is necessary to adjust the directional angle of the lens to the direction of an object. The box having an aiming means makes it easy to find a suitable directional angle of the lens equipped in the box, which allows good workability in the installation thereof. The aiming means is sufficient if it is able to adjust the directional angle to the direction of an object: a conceivable configuration is, for example, a sight-like device consisting of a pair of marks including a concave projection and a convex projection, or a laser pointer. More specifically, in the former case, a conceivable configurations is such that a concave projection is placed at one end and a convex projection is placed at the other end on the same surface of a housing box, and the directional angle can be appropriately adjusted by observing the convex projection from the concave projection, so as to adjust the direction of an object to the line formed by connecting the concave and convex projections.

In the system of the present invention, the sensor and the vehicle presence judgment means, which determines the presence of vehicles based on the value measured by the sensor, may be may be integrally as a single unit, or provided separately. In the former case, for example, the sensor and a central processing unit (CPU) for the vehicle presence judgment, etc. may be housed together in the housing box as a detecting unit. In the latter case, the sensor may be housed in a housing box as a detecting unit. In this case, the CPU for the vehicle presence judgment may be housed in a control box, and the control box may be installed on the same pole on which the detecting unit is installed or may be installed near the pole.

EMBODIMENTS OF THE PRESENT INVENTION

Preferred embodiments of the present invention are described in the following.

<Explanation of Processing Operation of Vehicle Detection Systems>

An explanation of the operation of the vehicle detection systems of the present invention is given below.

Example 1

FIG. 1 is a functional block diagram illustrating the operation of a vehicle detection system of the present invention in the case of intermittently operating a sensor by timer control and transmitting summed-up results through wire. This system detects infrared radiation irradiated from vehicles, etc., compares the detected result (an input level value) with a background level value, and determines the vehicle presence by comparing the difference between the input level value and the background level value with a threshold value. In this example, the difference between the input level value and the background level value is directly used as a comparative value, that is, a value based on the difference between the input level value and the background level value. Specifically, configured elements are as follows:

(1) Sensor Unit 10

In this example, a thermopile 10a is used as a sensor for detecting infrared radiation irradiated from an object such as a vehicle or the road. Particularly, a high output thermopile is used. In addition, the configuration is one in which the thermopile 10a and an amplifier 10b provided in the sensor unit 10 operate intermittently with supplying power periodically turned ON/OFF by timer 1.

(2) Data Processing Unit 11

A data processing unit 11 temporarily saves the input level value detected by the sensor unit 10, compares the input level value with the background level value, processes the background level value, and so on. In this case, the background level value is an average value of the saved input level values of infrared radiation irradiated from the background, that is, elements other than vehicles. More specifically, the data processing unit 11 is provided with a memory means (in which the input level value of detected infrared radiation irradiated from objects other than vehicles is saved as the background level value) and the vehicle presence judgment means (which, in this example, recognizes the vehicle presence in the case where the difference between the input level value detected by the sensor unit 10 and the background level value read out from the memory is more than the threshold value), and so on. This processing is done by a central processing unit (CPU) as needed.

In addition, in the system of the present invention, a solar battery unit 12 for supplying power to the sensor unit 10 and the data processing unit 11 are provided, and electricity is supplied by a solar battery 12a in this example. However, the electricity may be supplied from a normal power supply system.

In the vehicle detection system of the present invention, when the sensor unit 10 commences operation according to the timer 1, the thermopile 10a in the sensor unit 10 detects infrared radiation irradiated from an object. Electromotive force generated in the thermopile 10a and amplified by the amplifier 10b is transmitted to the data processing unit 11, and is converted to a digital signal at A/D converter 11a to obtain the input level value. Comparing the background level value with the input level value, the vehicle presence is determined depending on whether or not the difference between these levels is more than the threshold value. Values provided from the data processing unit 11 are summed up as detected results, and transmitted to signal controllers and a traffic control center through wire.

Operational procedures of the vehicle detection by the system are specifically explained below.

Figure 2:
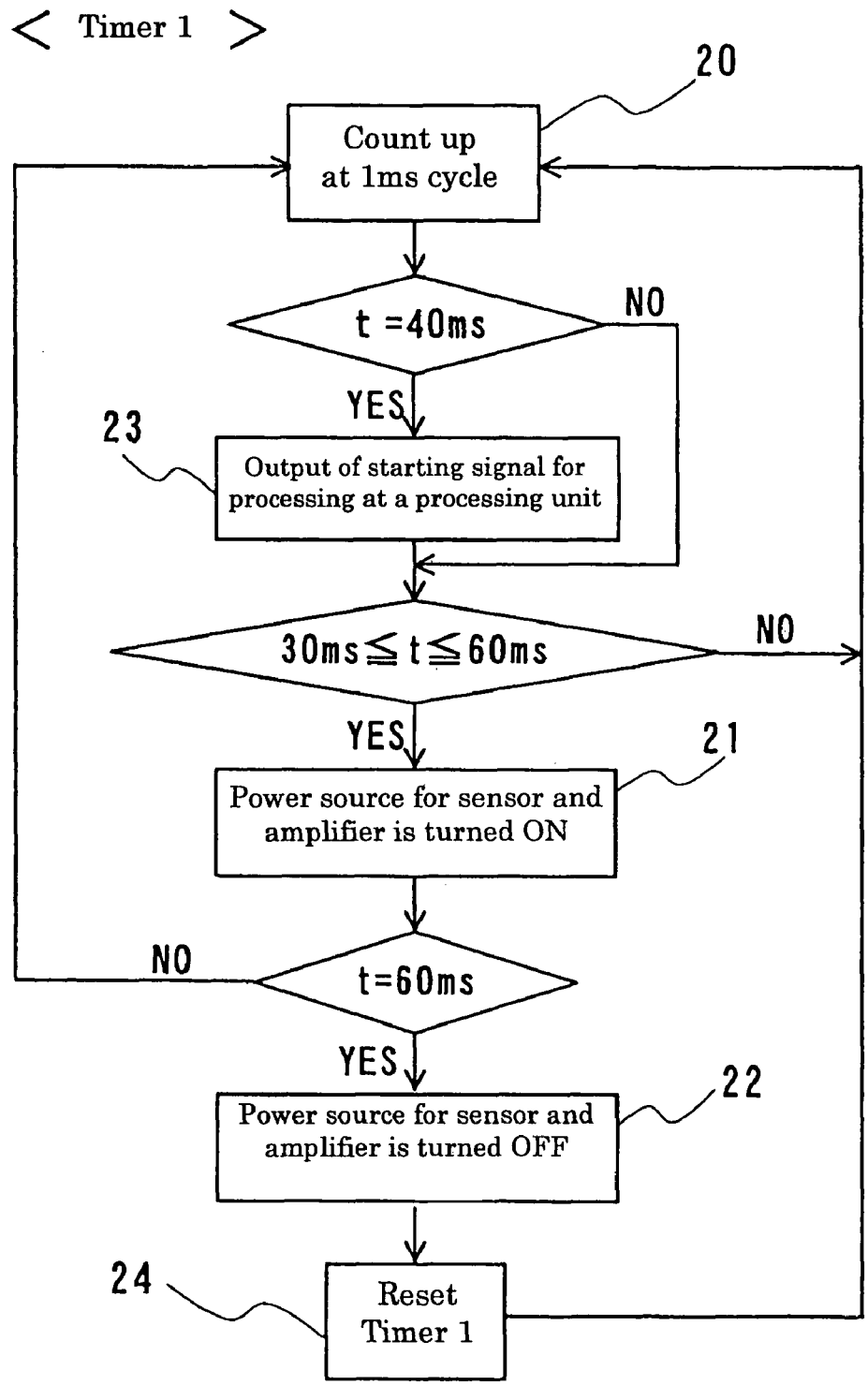
FIG. 2 is a flow chart illustrating the control procedures of timer 1 in Example 1.
Figure 3:
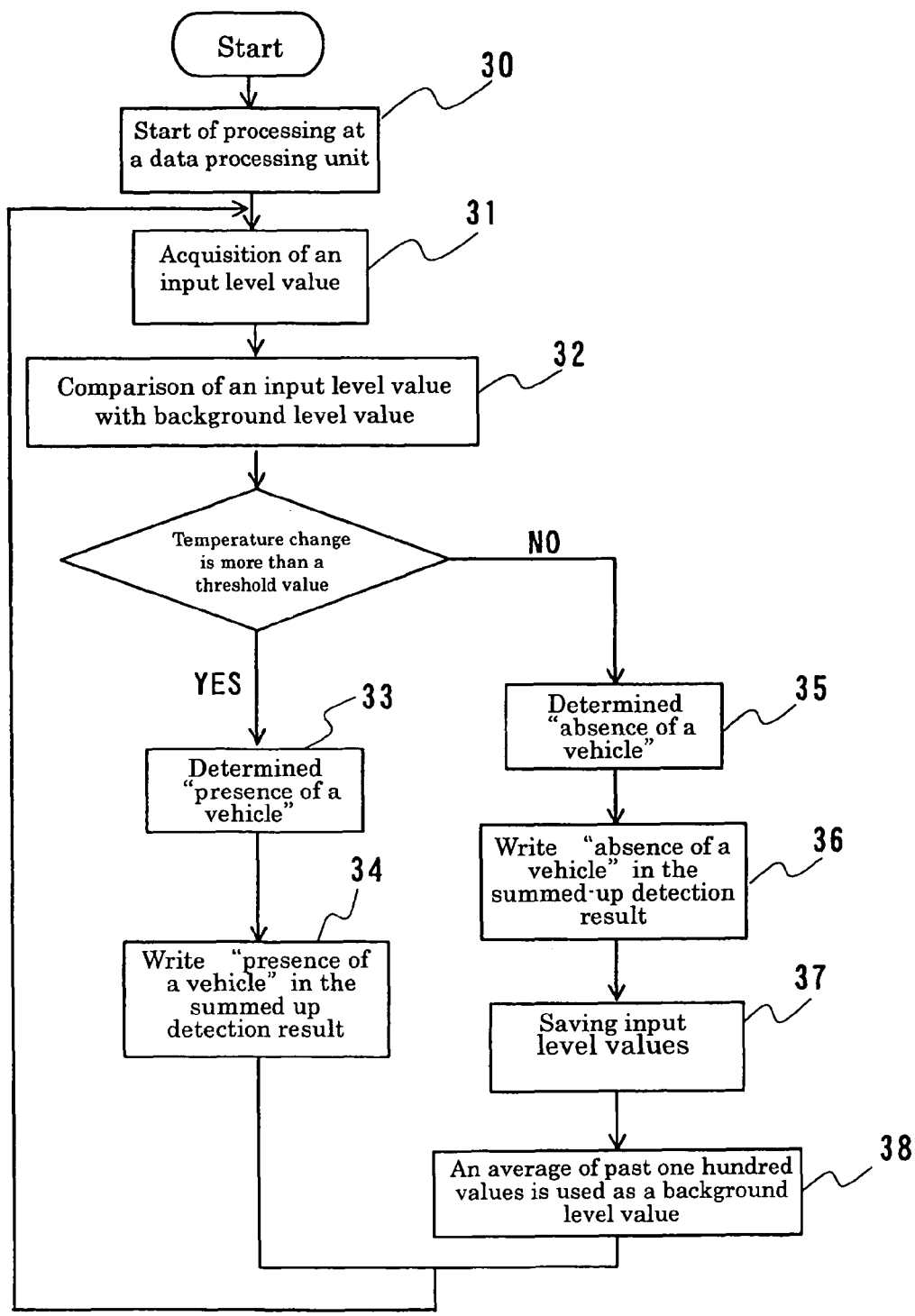
FIG. 3 is a flow chart illustrating processing procedures in a data processing unit of Example 1.

FIG. 2 is a flow chart showing control procedures of the timer 1, and FIG. 3 is a flow chart showing processing procedures in the data processing unit.

An explanation is given below with respect to the timer 1 which intermittently operates a sensor (a thermopile, in this example) and an amplifier (see FIG. 2). The timer 1, for example, counts up each 1 millisecond (ms) (Step 20), and controls the ON/OFF power source in a 60 ms cycle. In the 60 ms cycle, the sensor and the amplifier start to operate by turning ON the power source for the sensor and the amplifier at 30 ms, infrared radiation are detected during 30-60 ms by maintaining the ON the power source (Step 21), and the power source is turned OFF at 60 ms (Step 22). In addition, processing starts in the data processing unit at 40 ms (Step 23). The procedures are reset at 60 ms (Step 24), and the timer starts to count again, repeatedly. In this example, the processing time of the data processing unit (40 ms) starts 10 ms delayed from the starting time (30 ms) of the operation of the sensor and the amplifier, but it may be the same time as the starting time. In addition, cycles of count-up time, time of turning and/or maintaining the ON power source for the sensor and the amplifier, and reset cycle, etc. may be changed appropriately.

Processing of the data processing unit is explained (see FIG. 3). Processing of the data processing unit begins according to the operation of a sensor by the timer 1 (Step 30). Amplified electromotive force provided from the sensor is transmitted to the data processing unit to be an input level value (Step 31). The input level value is compared with the background level value saved in the memory (Step 32). If the difference between the input level value and the background level value (the change of temperature or emissivity) is equal to or more than the threshold value, the data processing unit determines presence of a vehicle (Step 33), and gives "presence of a vehicle" in the summed-up detected results (Step 34).

On the other hand, if the difference between the input level value and the background level value (the change of temperature or emissivity) is less than the threshold value, the data processing unit determines "absence of a vehicle" (Step 35). In this case, it means that the sensor has detected the conditions of background (a road etc.). The data processing unit gives "absence of a vehicle" in the summed-up detected results (Step 36). The data processing unit saves the input level value (Step 37) and calculates the average value of 100 input level values saved in the past, and the calculated value is saved in the memory as a background level value (Step 38).

The summed-up detected results given by Steps 34 and 36 are transmitted to signal controllers and so on by wire.

Thus, the vehicle detection system of the present invention achieves less power consumption by using a passive sensor consuming less electricity. Furthermore, in this example, the system achieves less power consumption by intermittent operation of the sensor and amplifier with the ON/OFF control of the power source for the sensor and amplifier by the timer 1.

Example 2

In Example 1, the summed-up detected results are transmitted to signal controllers and a control center, etc. by wire. However, by providing a radio communication unit (a radio communication means), these results may be transmitted by light such as infrared radiation or by radio.

Figure 4:
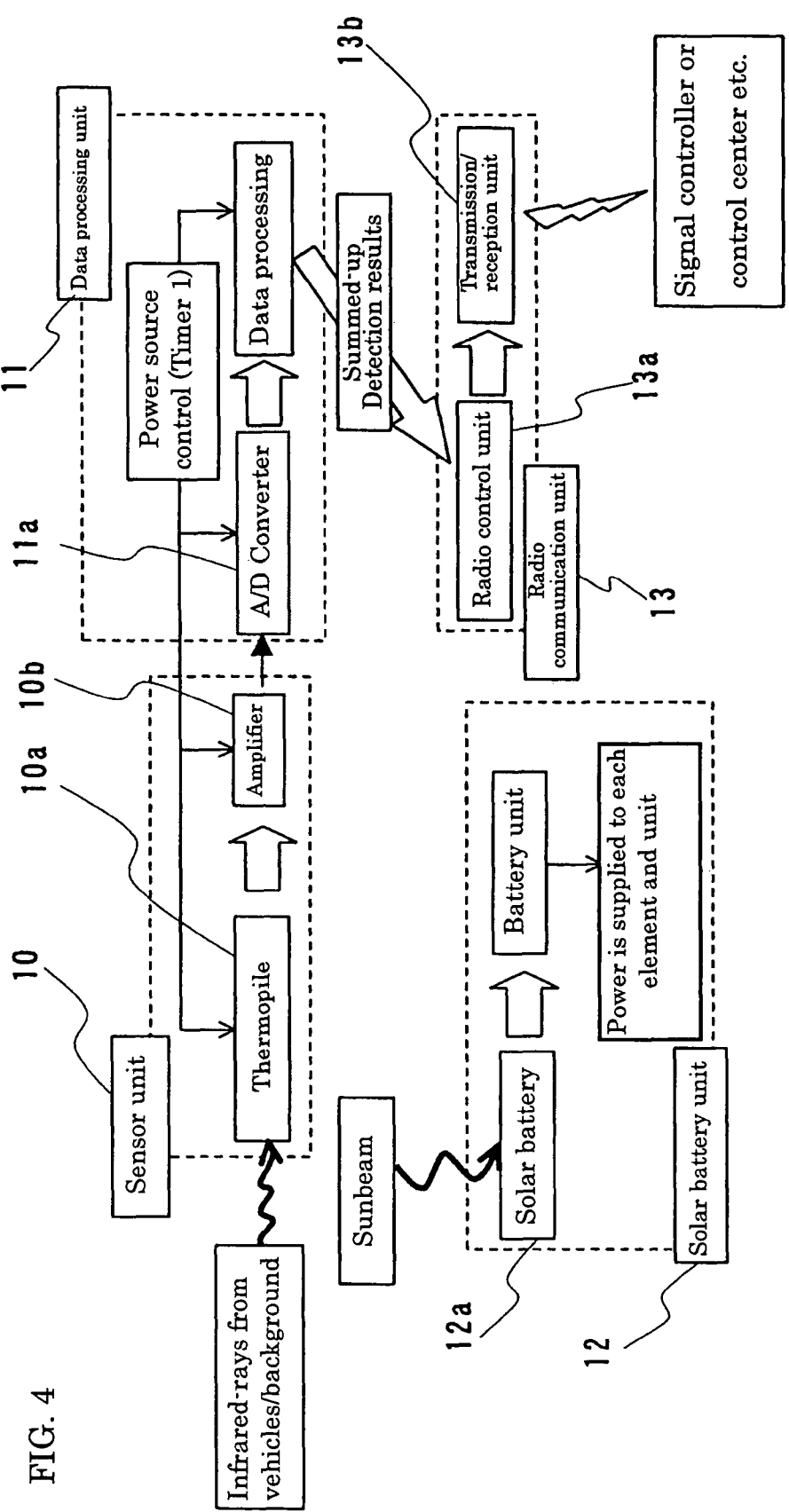
FIG. 4 is a functional block diagram illustrating a vehicle detection system of the present invention in the case in which a sensor operates intermittently by the timer controller and summed-up detected results of detected value are transmitted by a radio communication unit.

FIG. 4 is a functional block diagram of a vehicle detection system of the present invention having a radio communication unit; in the system, the sensor is intermittently operated by timer control. The basic configuration of the system is similar to the one illustrated in FIG. 1, the difference being that radio communication unit 13 is provided. The radio communication unit 13 having a radio control unit 13a and a transmission/reception unit 13b with an antenna, etc. transmits the summed-up detected results transmitted from the data processing unit 11 to signal controllers or a control center, and so on. In this example, electricity is intermittently supplied for a predetermined period at a predetermined interval to the radio communication means (the transmission/reception unit 13b in this example) by a timer 2 (not illustrated) provided in the power source control unit, and transmission/reception is carried out.

Figure 5:
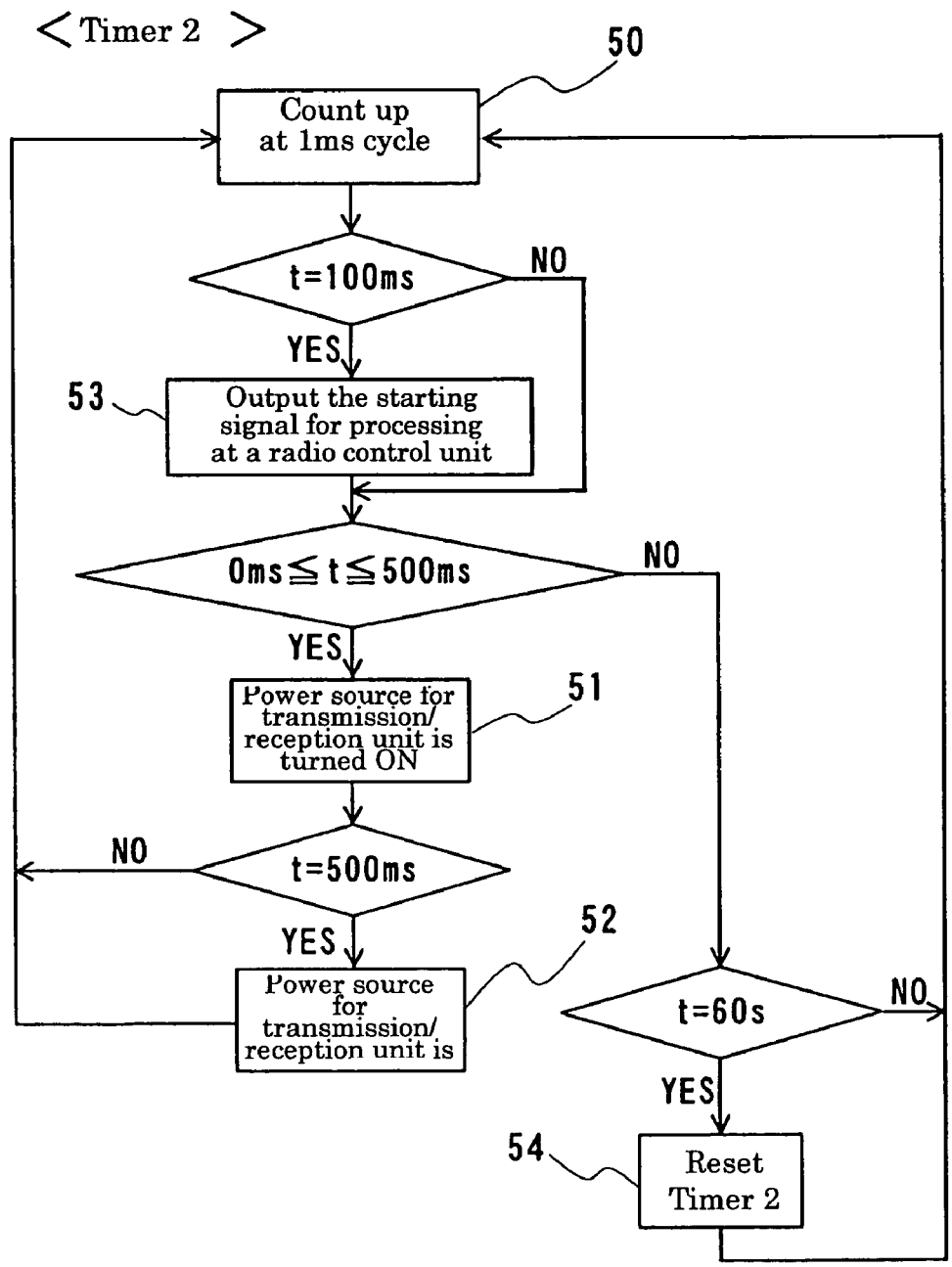
FIG. 5 is a flow chart illustrating control procedures of timer 2 in Example 2.
Figure 6:
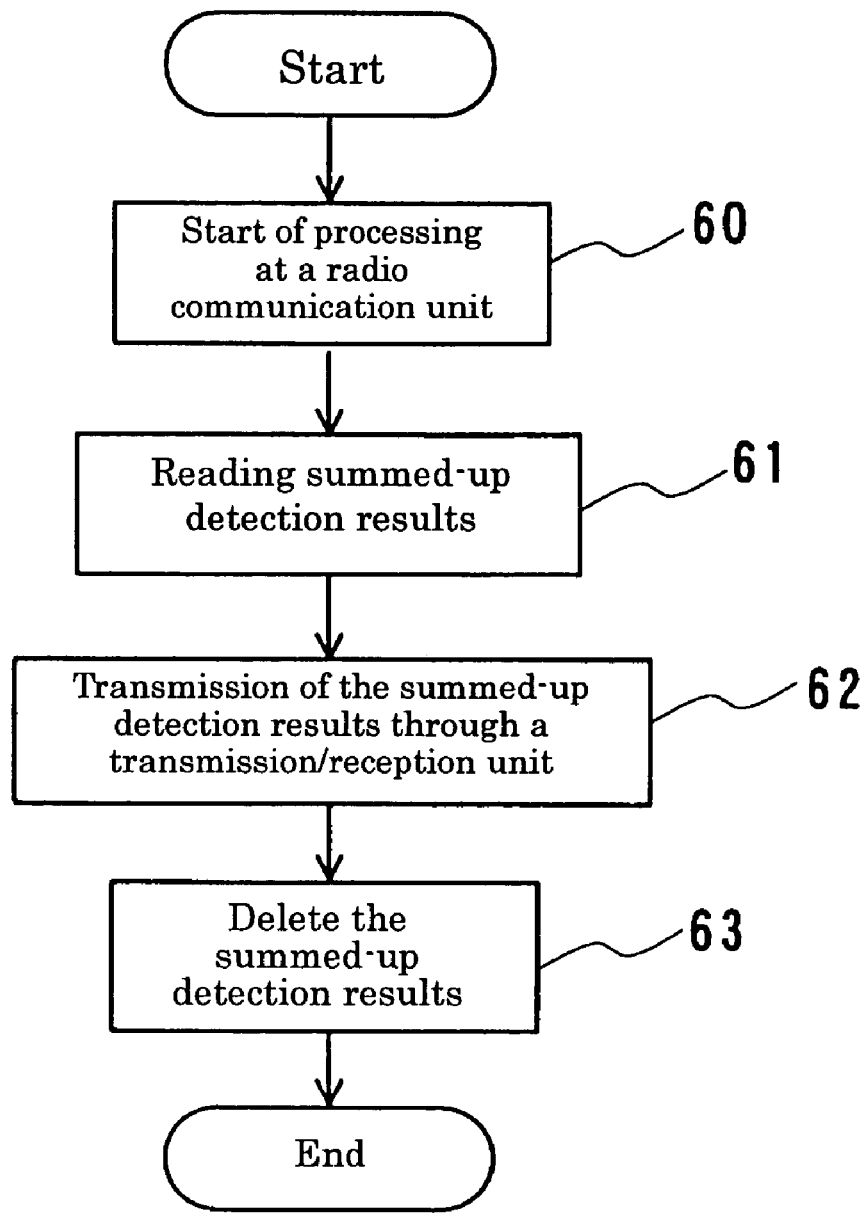
FIG. 6 is a flow chart illustrating processing procedures in a radio control unit.

FIG. 5 is a flow chart showing the control procedures of the timer 2, and FIG. 6 is a flow chart showing the processing procedures in a radio control unit.

For example, as shown in FIG. 5, the timer 2 counts up at every 10 ms (Step 50), and controls the ON/OFF power source for the transmission/reception unit at a 60 ms cycle. During 500 ms of 0-500 ms in each 60 seconds cycle, the power source for the transmission/reception unit is turned ON, and the processed results of the detected value are transmitted and received (Step 51). At the end of the 500 ms duration, the power source is turned OFF, and the transmission and reception is stopped (Step 52). Processing of the radio control unit starts at 100 ms (Step 53). The timer is reset at 60 seconds (Step 54) and restarts counting up, and such 60 seconds cycle is repeated. In this example, the starting time of the processing (100 ms) in the radio control unit is delayed from the starting time of operation of the transmission/reception unit (0 ms), but the starting time of the processing (100 ms) in the radio control unit may be the same with the starting time of operation of the transmission/reception unit. In addition, cycles of count up time, turning and maintaining time of the ON power source for the transmission/reception unit, and reset cycles may be changed appropriately.

According to FIG. 6, the radio control unit starts to process with turning ON the power source for the transmission/reception unit (Step 60). The radio control unit reads the summed-up detected results that are transmitted from the data processing unit (Step 61), and transmits these results to signal controllers and a control center, etc. through the transmission/reception unit (Step 62). After transmission, these results saved in the memory are deleted (step 63). Instead, these results saved in the memory may be maintained, and only the latest results may be transmitted.

Thus, the vehicle detection system of the present invention can transmit the results to signal controllers and a control center with less power consumption because of intermittent transmission by means of the power source control unit (timer 2 in this example). The timers 1 and 2 shown in Examples 1 and 2 may or may not be used synchronously.

Example 3

In the configured systems of Examples 1 and 2, a value based on the difference uses the difference between an input level value and a background level value as it is.

In addition, a sensor and an amplifier are configured to operate intermittently.

Another configuration of the system is explained in the following, wherein a value calculated from the difference between an input level value and a background level value is used as a value based on the difference, and a sensor and an amplifier continuously operate.

Figure 7:
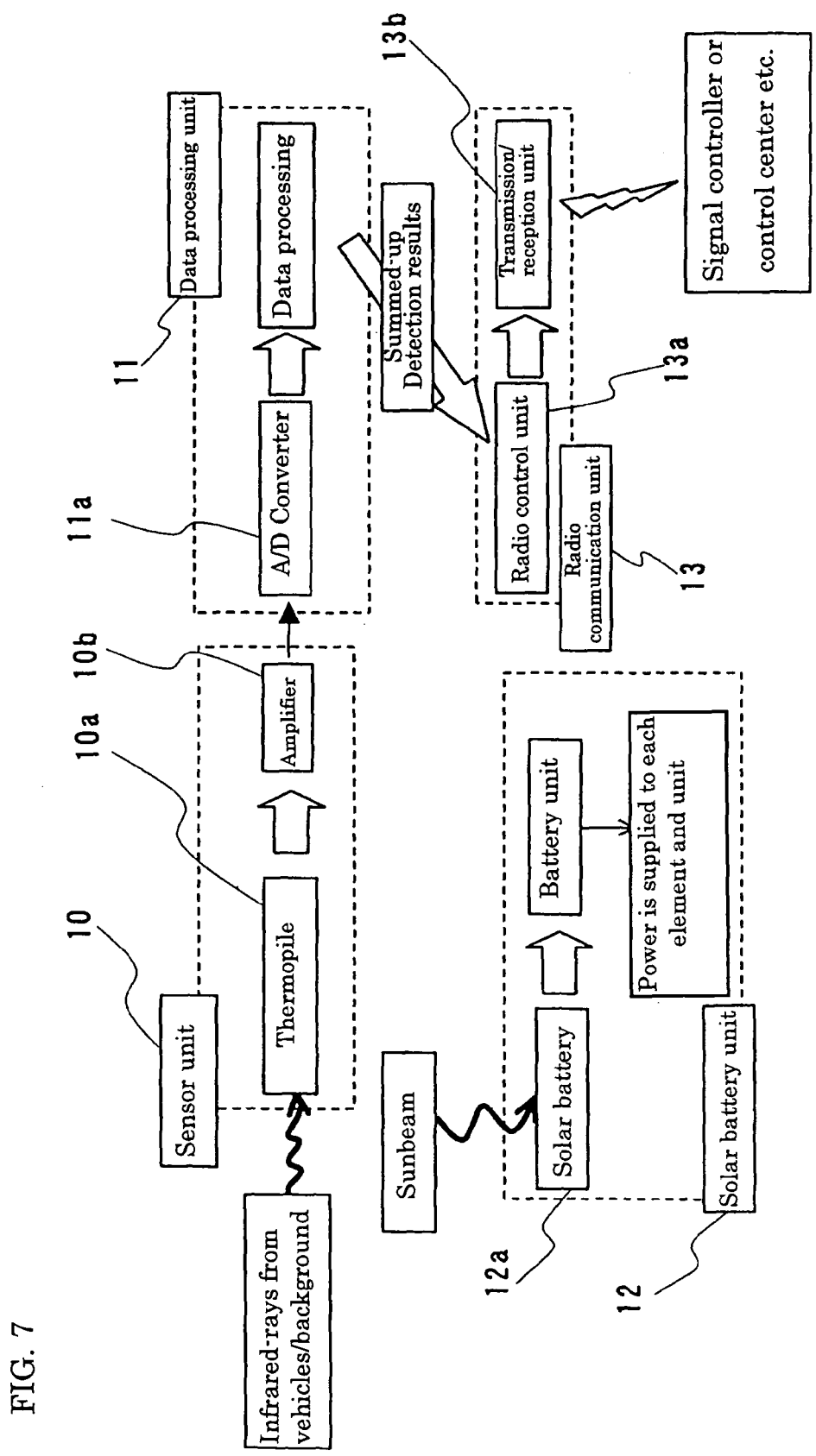
FIG. 7 is a functional block diagram illustrating the vehicle detection system of the present invention in the case in which a sensor operates continuously and summed-up detected results are transmitted by radio.

FIG. 7 is a functional block diagram of the vehicle detection system of the present invention having a radio communication unit, in which systems a sensor continuously operates. The basic configuration elements of this system are similar to those of Example 2 shown in FIG. 4 except that this system has no timer 1 to control a power source for a sensor in the sensor unit 10 (the thermopile 10a, in this example) and the amplifier 10b. In addition, another difference is that the data processing unit thereof performs not only calculation of a background level value and determination of vehicle presence, but also calculation of a threshold value and a difference value based on the difference between an input level value and the background level value, and so on. Further details are described in the following.

This system is similar to the systems described in Examples 1 and 2 in the following respects:
1. The sensor unit 10 (the thermopile 10a, in this example) detects infrared radiation irradiated from an object to be detected;
2. The detected infrared radiation generates an electromotive force in the thermopile 10a, and the electromotive force is amplified by the amplifier 10b;
3. The amplified electromotive force is transmitted to the data processing unit 11 and converted to digital signals by the A/D converter 11a; and
4. An input level value is obtained.

A value (a comparison value) which is based on the difference between the input level value and a background level value is calculated, and the vehicle presence is determined based on whether the comparison value is more than the threshold value. The summed-up detected results provided from the data processing unit 11 are transmitted to the radio communication unit 13, and the results are transmitted to signal controllers or a traffic control center via transmission/reception unit 13b the same as in Example 2.

Operational procedures of the vehicle presence detection by the system are specifically explained in the following.

Figure 8:
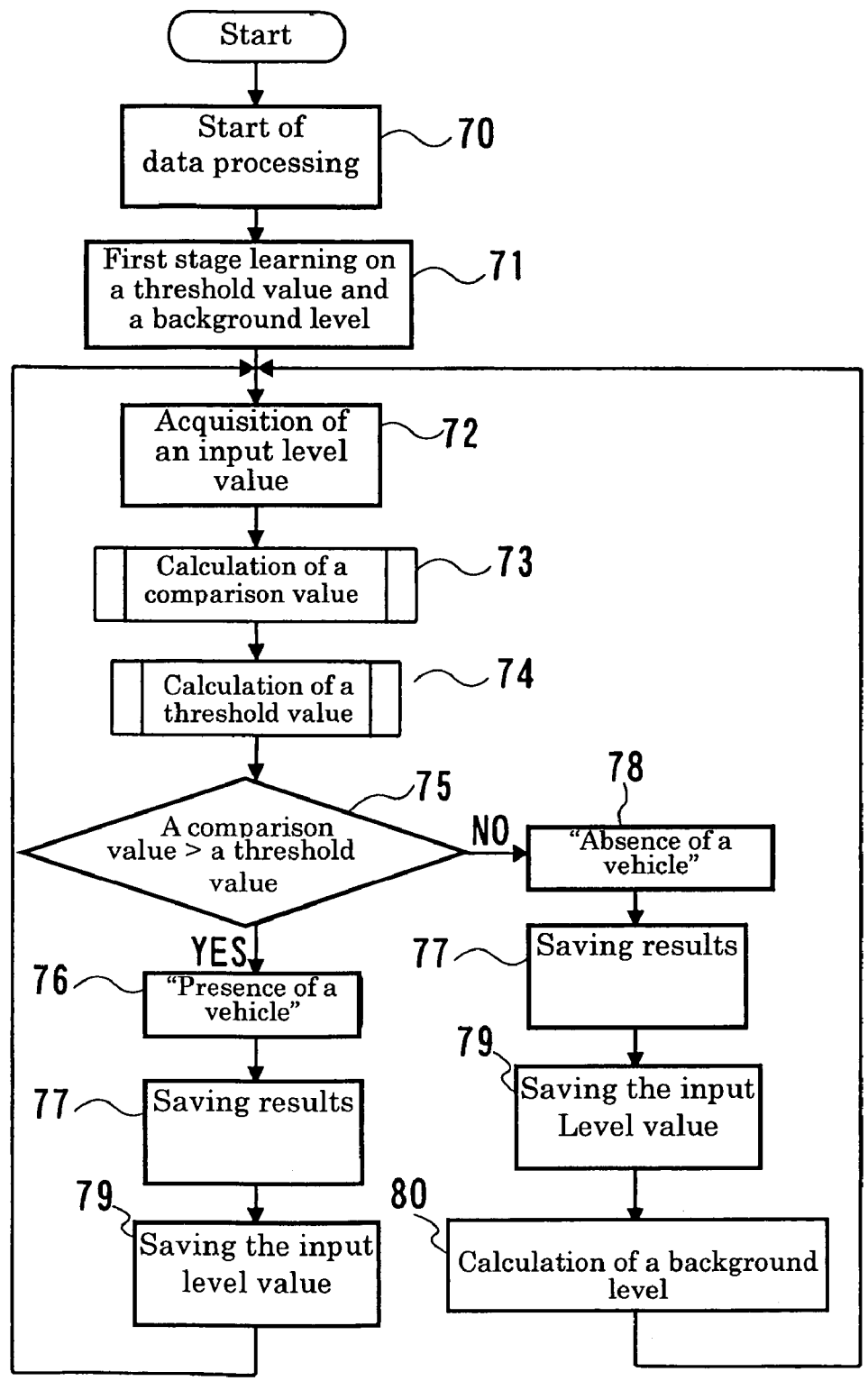
FIG. 8 is a flow chart illustrating processing procedures in a data processing unit in Example 3.

FIG. 8 is a flow chart illustrating the processing procedures in the data processing unit. In this case, processing in the data processing unit begins with the operation of the sensor. (Step 70). Upon beginning of the processing, an initial learning about the background level value and the threshold value is carried out (Step 71). There may be a case in which it is difficult for a CPU to find only the background value from the data obtained in a situation where vehicles are running. Therefore, at an initial learning stage about the background level value, it is preferable not to carry out the vehicle presence determination. Accordingly, it is preferable that a power source for the sensor and the data processing unit be turned ON when there is no vehicle, or a trigger such as reset be provided. Since the initial learning about the background level value is carried out when there is no vehicle, it is preferable that the time of the initial learning be short, for example, around one second. For the initial learning of the background level value, an average value of input level values may be adopted when there is no vehicle. On the other hand, in the case where the initial learning about the background level value is carried when there is a vehicle, a mode value of input level values during a predetermined time may be adopted as one specific example of the background level value.

After completing the initial learning about the background level value, the learning about the threshold value is carried out for a predetermined time, for example 10 seconds. If an initial threshold value is set to be large enough, the initial threshold value automatically falls to an appropriate value by learning. By performing such procedures of the initial learning, more reasonable values can be adopted for both the background level value and the threshold value, that is, more exact values fitted for actual circumstance can be adopted. The background level value and the threshold value thus obtained are saved in a memory.

A vehicle presence judgment starts after the initial learning. The electromotive force detected at the sensor is first amplified and transmitted to the data processing unit, and the input level value is obtained (Step 72). Based on this input level value, the comparison value is calculated by the procedures described below (Step 73). The threshold value is also calculated based on the input level value by the procedures described below (Step 74). The comparison value is compared with the threshold value (Step 75). If the comparison value is equal to or more than the threshold value, the data processing unit recognizes it as "presence of a vehicle" (Step 76), gives "presence of a vehicle" in the summed-up detected results, and saves the results (Step 77). In the example, the input level value is also saved for use in calculation of the background level value as described below.

On the other hand, if the comparison value is below the threshold value, the data processing unit determines it to be absence of a vehicle (Step 78), gives "absence of a vehicle" in the summed-up detected results, and saves it in the memory (Step 77). Such case is a case where the sensor has detected a background such as a road. The input level value used for this judgment is saved for calculation (Step 79), and the background level value is calculated by this input level value (Step 80).

A radio communication means confirms as needed whether the summed-up detected results processed in Step 77 are saved or not, and transmits the summed-up detected results to signal controllers by the same procedures as described above (see FIG. 5 or 6). The transmission of the summed-up detected results to the signal controllers occurs when a power source for a transmission/reception unit is in the ON-state. When the power source for the transmission/reception unit is in the OFF-state, the summed-up detected results are saved as they are, and the results are transmitted after the power source for the transmission/reception unit is turned ON.

The background level value used in the system in this example is described here. In Example 1, an average input level value obtained during "absence of a vehicle" was used as the background level value, but in this example a value calculated by the exponential smoothing method is used as a background level value. Specifically, a value $a_n$ by the equation $a_n = a_{n-1} + \alpha \times (b_n - a_{n-1})$ is used as the background level value, wherein $b_n$, $a_n$ and $\alpha$ are input level value, a background level value to be used in the next judgment, and a smoothing constant, respectively, and $a_{n-1}$ is a background level value used in the last vehicle presence judgment. The smoothing constant $\alpha$ is adjusted according to the last vehicle presence judgment result in order that the background level value may not be affected by the temperature of the vehicles, but fitted to actual circumstances. For example, when the last judgment result is "presence of a vehicle", the smoothing constant α is adjusted to a smaller number ($α_{ON}$) such as 0, and when the last judgment result is "absence of a vehicle", the smoothing constant α is adjusted to a larger number ($α_{OFF}$) such as 0.025. Since the background level value calculated by the exponential smoothing method reflects more actual circumstances, higher precision vehicle presence judgment can be achieved.

Procedures to calculate a background level value are explained in the following.

Figure 9:
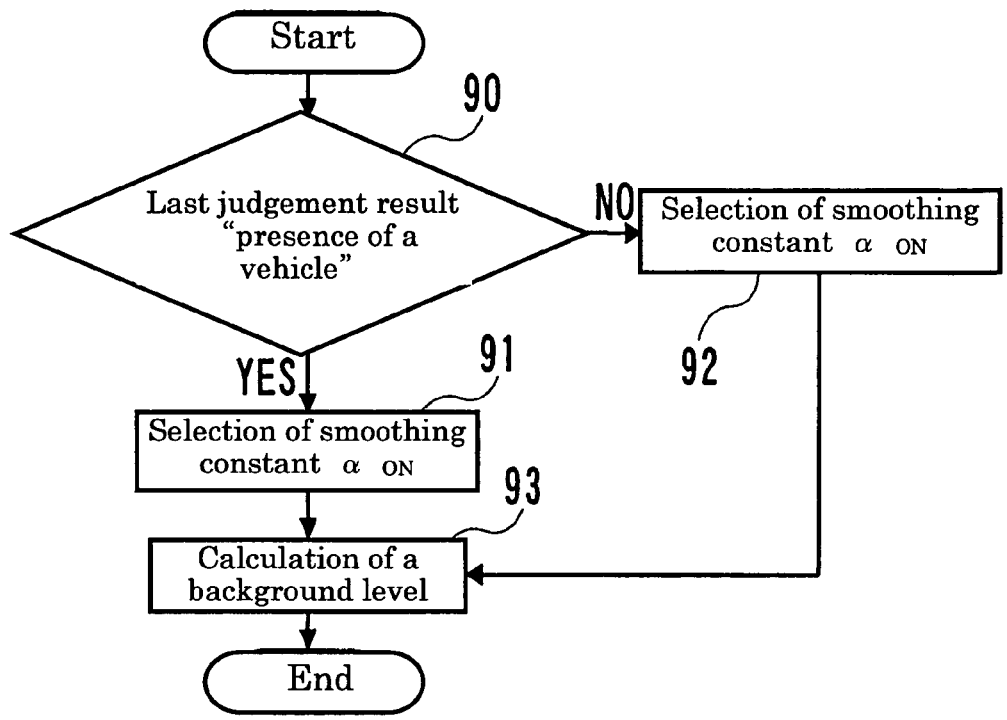
FIG. 9 is a flow chart illustrating calculation procedures of a background level value in Example 3.

FIG. 9 is a flow chart illustrating the calculation procedures of the background level value. First, the last vehicle presence judgment result is read out from the memory and the judgment result on whether presence or absence of a vehicle is confirmed (Step 90). When the last judgment is "presence of a vehicle", $α_{ON}$ is selected as the smoothing constant (Step 91). When the last judgment is "absence of a vehicle", $α_{OFF}$ is selected as the smoothing constant (Step 92). The background level value is calculated by substituting the input level value $b_n$, the last background level value $a_{n-1}$ read out from the memory and a selected smoothing constant in the equation for the background level value, $a_n = a_{n-1} + α \times (b_n - a_{n-1})$, inserting (Step 93).

The details of the comparison value used for the system in this example are described below. In Example 1, the difference between the input level value and the background level value was used as the comparison value as it was, but in this example the value based on the difference was used as the comparison value as it was, but in this example a value calculated based on the difference is used as the comparison value: specifically, calculating a finite difference of the input level value $b_n$ with the last background level value $a_{n-1}$ (such finite difference is called "background finite difference"), and an integrated value of the background finite difference thus calculated during a predetermined time is used as the comparison value.

Thus, since a calculated value based on the difference between the input level value and the background level value is used as the comparison value as shown above, the misdetection of a vehicle presence can be reduced.

The calculation procedures of the comparison value are explained here.

Figure 10:
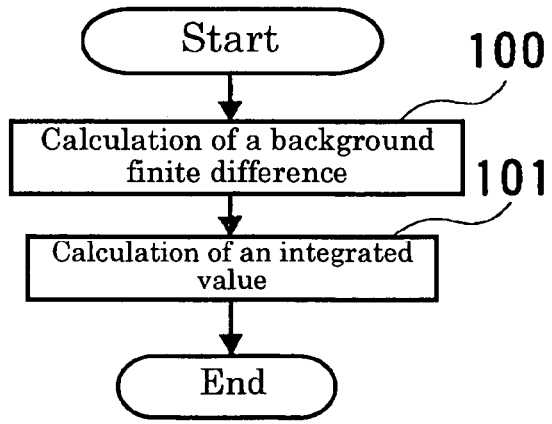
FIG. 10 is a flow chart illustrating calculation procedures of a comparison value in Example 3, wherein an integrated value is used as the comparison value.

FIG. 10 is a flow chart of the calculation procedures of the comparison value in the case where an integrated value is used as the comparison value. First, a finite difference of the input level value with the last background level value (the background finite difference) is calculated (Step 100). The background finite difference $S_n$ in this example is defined as an absolute value of the difference between $b_n$ and $a_{n-1}$. That is, $S_n = |b_n - a_{n-1}|$. Next, an integrated value $I_n$ is calculated from the background finite difference $S_n$ for a predetermined period by the following equation $I_n = \Sigma S_k$ (Step 101). In this example, the background finite differences are calculated by sensing input level values with a sensor at a predetermined time such as an every 10 ms, and integrating the background finite differences obtained during a predetermined time such as 160 ms, which means 16 background finite differences are integrated. In this example, the integrated value $I_n$ is used as the comparison value. The time and number of integrations may be changed appropriately. This also applies to the case described later where an integrated value and variation of input level value per unit time are used as the comparison value.

Another comparison value is explained in the following. When only the above described integration value is used, the comparison value may happen to be 0, and misdetection of a vehicle presence may occur. Therefore, it is preferable that a value calculated based on an integrated value and variation of input level value per unit time be used as the comparison value. Specifically, a finite difference (a background finite difference) between the input level value and the last background level value is calculated first, and an integrated value of the background finite differences during a predetermined period is calculated in the same manner as in the above description. Next, the variations in the input level values are calculated, and subsequently an average value of the variations is calculated. Adding which is obtained by multiplying the average value by a predetermined number is added to the integrated value, and thereby the comparison value is obtained. As thus described, by using the comparison value that is calculated by not only the integrated value but also the variations, detection error such as misdetection or failure to detect a vehicle presence can be further reduced. In addition, by adopting an algorithm using a value in which the variation is taken into consideration, the vehicle presence judgment can be satisfactorily achieved solely by detecting infrared radiation with the thermopiles without other types of sensors such as a pyroelectric sensor.

Procedures to calculate the comparison value are explained in the following.

Figure 11:
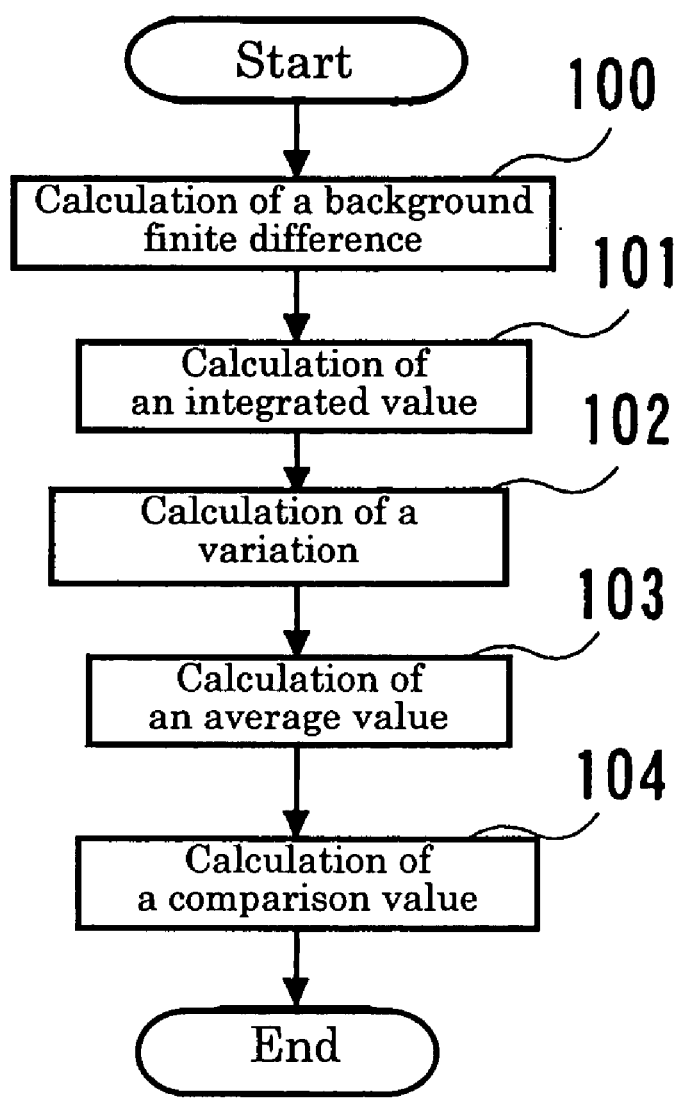
FIG. 11 is a flow chart illustrating calculation procedures of the comparison value in Example 3, wherein an integrated value and differential amounts are used as the comparison value.

FIG. 11 is a flow chart of the calculation procedures of the comparison value for which the integration value and the variations are used. First, an infinite difference between the input level value and the background level value, that is, the background finite difference $S_n$, is calculated according to the following equation $S_n = |b_n - a_{n-1}|$ in the same manner as in FIG. 10 (Step 100). Next, the integrated value $I_n$ is calculated from the background finite differences $S_n$ for a predetermined time by the equation $I_n = \Sigma S_k$ (Step 101). In this example, 16 background infinite differences $S_n$ are integrated as in the above case. The variation $D_n$ of the input level value per unit time is calculated (Step 102). In this example, the input level value used for the calculation of the background finite difference is not the input level value detected just before, but the input level value detected slightly earlier than that. For example, when an input level value is measured every 10 ms, the variation is defined as $|b_n - b_{n-16}|$, which is an absolute value of difference between $b_n$ (the detected input level value) and $b_{n-16}$ (the input level value detected 160 ms before). Next, the average $B_n$ of the variations $D_n$ is calculated (Step 103). In this example, the average is calculated by the particular number, eight for example. That is, the average value is calculated by the following equation, $B_n = \frac{1}{8} \times \Sigma D_k$ (k=n−7 ... n). And the comparison value is calculated by adding the integration value $I_n$ to a value obtained by multiplying the average value $B_n$ by a constant (Step 104). The comparison value in this example is calculated by $I_n + B_n \times A$, wherein A is a constant such as A=40. The constant A is an arbitrary value determined depending on the respective degree of participation of the integrated value $I_n$ and the average value $B_n$, to the comparative value. Calculated values in each step are saved in the memory to use in the next calculation. The constant A and the particular number for calculating the average value and may be changed appropriately.

The threshold value for the use in the system of this example is described. It is also preferable to change the threshold value depending on the actual circumstances. In this example, the threshold value is changed according to the change in the amount of infrared radiation, that is, the change of temperature or emissivity. The degree of the change occurring in the amount of temperature or emissivity tends to depend on the last result of the vehicle presence judgment. In this example, therefore, the threshold value is changed according to the last result of the vehicle presence judgment.

Specifically, a set value is set as the minimum value, and the threshold value is changed depending on the circumstances by adding a modification value to the set value. In this example, therefore, the modification value is changed depending on the last result of the vehicle presence judgment. In this example, the modification value is obtained by adding a value: specifically, (the present modification value)=(the last modification value)+{(the average value of the integrated values×β)−(the last modification value)}×θ, wherein β is a modification coefficient and θ is a constant, e.g., 0.01.

The β is changed in order to change the present modification value depending on the last result of the vehicle presence judgment. More specifically, when the last result of the judgment is "presence of a vehicle", a smaller value ($\beta_{ON}$) such as 12 is adopted as the modification coefficient, and when the last result of the judgment is "absence of a vehicle", a comparatively large value ($\beta_{OFF}$) such as 36 is adopted as the modification coefficient. Thus, changing the threshold value with the change of the modification value allows the vehicle presence judgment to tend to maintain the judgment of "presence of a vehicle" once such judgment is made. In addition, when vehicles stop due to the traffic jams, the judgment tends to maintain the judgment of "presence of a vehicle", and when the vehicles begin to run, the judgment tends to determine "absence of a vehicle". In the case of the threshold value determined by calculation, the threshold value may over increases depending on the situation. To avoid this, it is preferable to have a maximum limit for the threshold value.

Calculation procedures of the threshold value are explained in the following.

Figure 12:
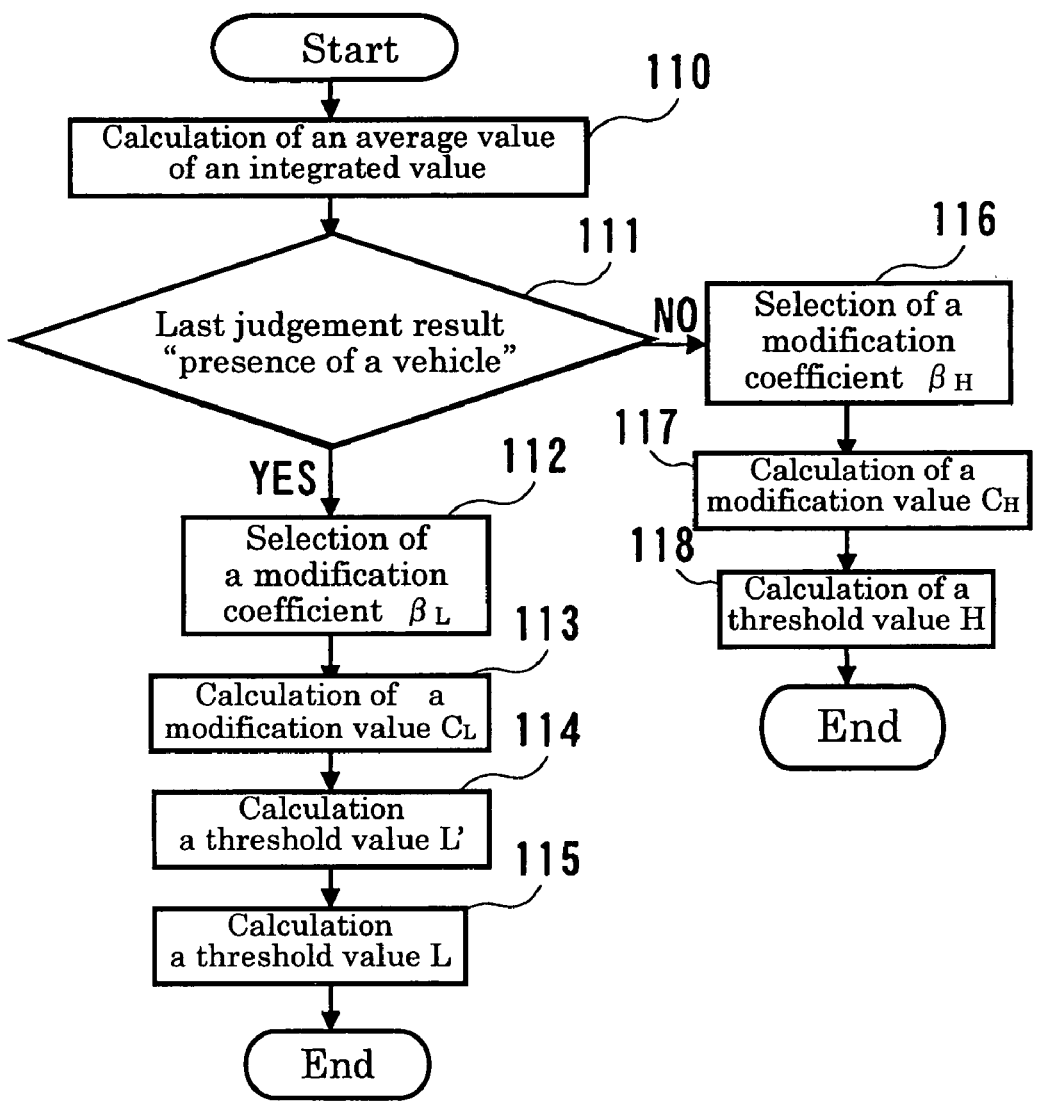
FIG. 12 is a flow chart illustrating calculation procedures of a threshold value in Example 3.

FIG. 12 is a flow chart of the calculation procedures of the threshold value. First, the average of the integrated values is calculated (Step 110). In this example, the average integrated value $I_n$ is $\frac{1}{16} \times I_n$. In this example, the background finite differences are calculated as in the above, by the detection of the input level values every 10 ms, and the threshold value is obtained by dividing the integrated value $I_n$ by 16, wherein the integrated value is obtained by adding up 16 background finite differences based on the input value detected for 160 ms. A read-out of the integrated value $I_n$ which is saved in the memory may be used. Next, the last result of the vehicle presence judgment is read out from the memory in the same manner as the calculation of the background level value to confirm whether it is "presence of a vehicle", or not (Step 111). If the last judgment is "presence of a vehicle", the modification coefficient of $\beta_{ON}$ ($\beta_L$ in FIG. 12) is selected (Step 112). A modification value $C_L$ is calculated by using the modification coefficient $\beta_{ON}$ (Step 113).

That is, $C_L$ is calculated by the following equation:

$C_L$=(the last modification value)+{($\frac{1}{16} \times I_n \times \beta_{ON}$)−(the last modification value)}×0.01, wherein θ=0.01.

The threshold value L' is calculated by adding the modification value $C_L$ to a set value (1000, for example) (Step 114). Furthermore, the threshold value L is calculated by multiplying the threshold value L' by a hysteresis coefficient (Step 115).

In this example, a value calculated by the following equation is used as the threshold value L: (the hysteresis coefficient)×[(the set value)+(the last modification value)+{(the average value of the background finite difference)−(the last modification value)}×θ].

The difference between the threshold value L and threshold value H described below is easily recognized since only the threshold value L is multiplied by the hysteresis coefficient, and accordingly the excessively frequent occurrence of judgment such as "presence of a vehicle" or "absence of a vehicle" in a short time can be prevented when the comparison value fluctuates near the threshold value. The hysteresis coefficient, for example, is 0.9 when the modification coefficient is $\beta_{ON}$, and 1 when the modification coefficient is $\beta_{OFF}$.

On the other hand, if the last judgment was "absence of a vehicle", the modification coefficient $\beta_{OFF}$ ($\beta_H$, in FIG. 12) is selected (Step 116). A modification value $C_H$ is calculated by using the modification coefficient $\beta_{OFF}$ (Step 117). That is, $C_H$ is calculated by the following equation: $C_H$=(the last modification value)+{($\frac{1}{16} \times I_n \times \beta_{OFF}$)−(the last modification value}×0.01, wherein θ=0.01.

And, the threshold value H is calculated by adding the modification value $C_H$ to the set value (1000, for example) (Step 118).

The modification coefficient β, the particular number for calculating an average value, and the constant θ may be appropriately changed. Particularly in the case of using only the integrated value or both the integrated value and the variation for the purpose of comparison value, the threshold value may be changed by changing the above-mentioned coefficient, number, and constant or by other calculations. In addition, values calculated in each step are saved in the memory for use in the next calculation.

Figure 13:
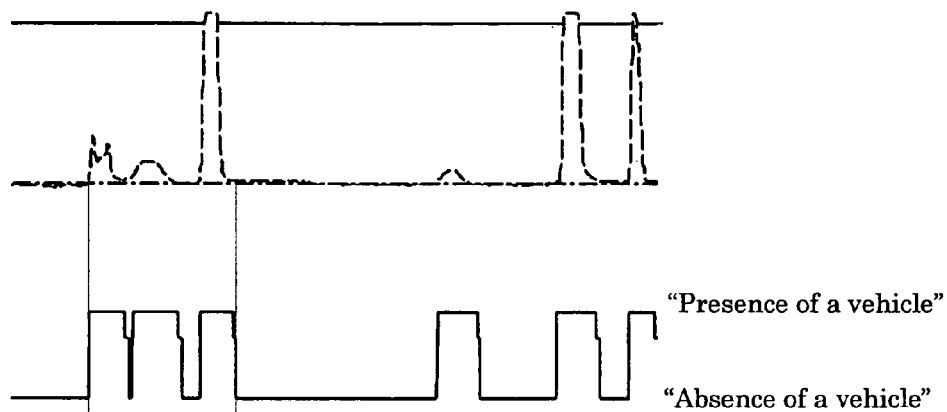
FIGS. 13(A) and (B) are graphs showing a case in which the vehicle detection system of the present invention is operated in fine weather.
FIG. 13(B) shows threshold values L, threshold values H and comparison values.
Figure 13:
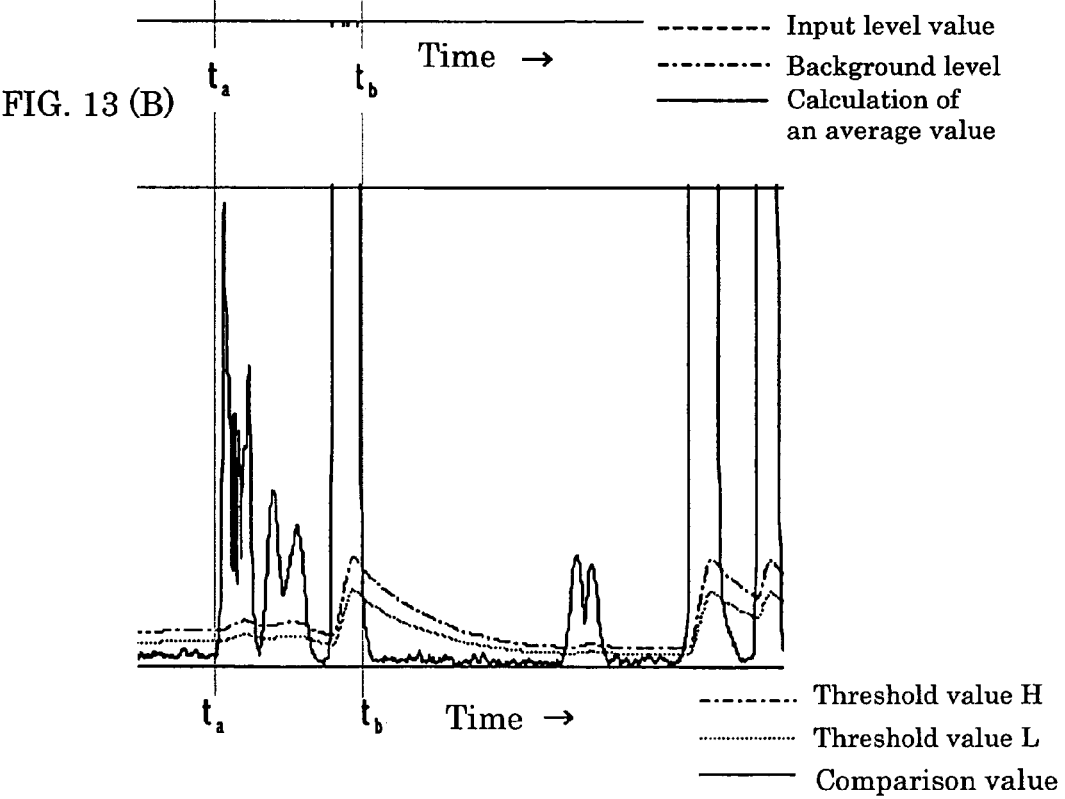
Figure 14:
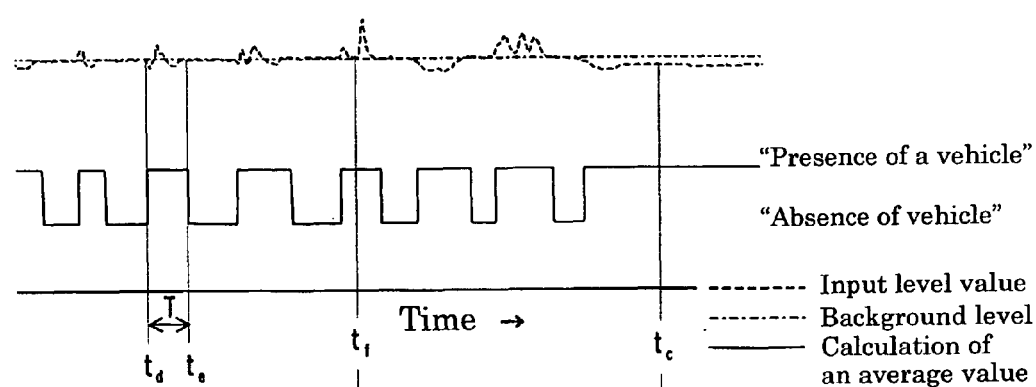
FIGS. 14(A) and (B) are graphs showing a case in which the vehicle detection system of the present invention is operated in rainy weather.
FIG. 14(B) shows threshold values L, threshold values H and comparison values.
Figure 14:
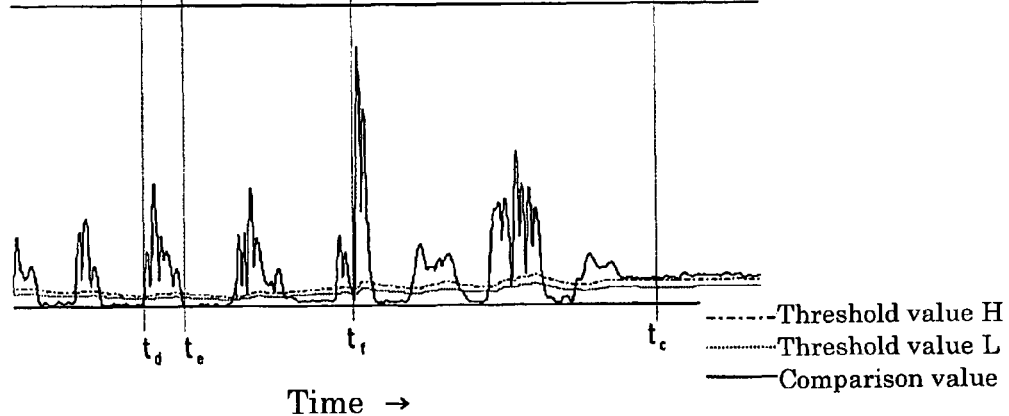

FIGS. 13 and 14 are graphs in the case where the vehicle detection system of the present invention is operated, FIG. 13(A) showing the input level values, the background level values, and the judgment results obtained in fine weather, and FIG. 13(B) showing the threshold values L, the threshold value H, and the comparison values. FIG. 14(A) shows the input level values, the background level values, and judgment results obtained in rainy weather, and FIG. 14(B) shows the threshold values L, the threshold values H, and the comparison values. In FIGS. 13 and 14, the axes of abscissa of in the graphs of both (A) and (B) show the progress of time, and the time is correspondent in both graphs. As shown in FIG. 13 (B), in fine weather, since a fluctuation of amplitude of the input level values is comparatively large, the difference between "presence of a vehicle" and "absence of a vehicle" in terms of the input level values and the background level values are relatively clear. However, as shown in FIG. 13 (B), such differences can be more clearly recognized in the case where the calculated comparison values based on the input level value are used. Therefore, the vehicle detection has higher precision in the case where the calculation value based on the difference between the input level value and the background level value is used as the comparison value, as compared with the case where using the comparison value is the difference between the input level value and the background level value, as it is.

A detailed explanation of a judgment based on the graph shown in FIG. 13(B) is given: for example, time $t_a$ is considered. The last result of vehicle presence judgment at the time $t_a$ is "absence of a vehicle" as shown in FIG. 13(A). Therefore, the threshold value H is selected, and by comparing the threshold value H with the comparison value, the judgment becomes "presence of a vehicle" because of the following criteria: (the comparison value)≧(the threshold value H).

That is, the judgment determines "presence of a vehicle" at the time $t_a$. Since the last judgment (at the time $t_a$) was "presence of a vehicle", the threshold value L is selected in the next judgment after the time $t_a$. Next, time $t_b$, for example, is considered. The last result of the vehicle presence judgment at the time $t_b$ was "presence of a vehicle" as shown in FIG. 13(A). Therefore, the threshold value L is selected, and by comparing the threshold value L with the comparison value the judgment is "absence of a vehicle" because of the following criteria: (the comparison value)<(the threshold value L).

That is, the judgment is "absence of a vehicle" at the time $t_b$. However, in this example of the configuration of the system, time of the "presence of a vehicle" is extended only to the holding time of the detection as described below. Since the last judgment (at the time $t_b$) was "absence of a vehicle", the threshold value L is selected in the next judgment after the time $t_b$. In this example, the right shoulders in the graph of judgment results have a shape of steps because a judgment is held for a predetermined holding time for effectively avoiding misdetection of vehicles when the judgment is shifted from "presence of a vehicle" to "absence of a vehicle". In this example, the predetermined holding time was about 115 ms.

On the other hand, as shown in FIG. 14(A), in rainy weather the fluctuation amplitude of the input level values is comparatively small, and consequently the difference between when a vehicle is present and when a vehicle is absent are rather small in terms of the difference between the input level values and the background level values. In addition, for example, the input level value of a roof part of a vehicle tends to be smaller than the background level value at some time period, but an input level value of the engine part of the vehicle, etc. tends to be higher than the background level value. Therefore, if an input level value smaller than the background level value and an input level value larger than the background level value are continuous as in section T in FIG. 14(A), for example, it is difficult for the vehicle presence judgment to determine whether the input level value is detected from the same vehicle or not, when using the difference between the background level value and the input level value as it is. However, if calculated comparison values based on the input level value, especially the calculated comparison values considering the above-mentioned integrated value and variation are used as shown in FIG. 14(B), the vehicle presence judgment is more precisely determined because the difference between the input level value and the background level value are more clearly exhibited. For example, even at time $t_C$ when vehicles are in a traffic jam and the difference between the input level value and the background level value is small, the vehicle presence judgment can precisely determine that vehicles are present, by using the comparison value considering the integrated value.

Furthermore, if an input level value smaller than the background level value and an input level value larger than the background level value are continuous, for example, as in section T in FIG. 14(A), the use of comparison value in which the variation is considered enables the vehicle presence judgment to precisely determine whether the input level value is given from the same vehicle or not. In this example, the input level values are understood to be given from the same vehicle.

The judgment based on the graph shown in FIG. 14(B) can be carried out in the same manner as in FIG. 13. Considering time $t_d$, for example, since the last result of the vehicle presence judgment at time $t_d$ is "absence of a vehicle" as shown in FIG. 14 (A), the threshold value H is selected, and comparing the comparison value and the threshold value H the judgment determines "presence of a vehicle" by the following criteria: (the comparison value)$\geq$(the threshold value H).

In the next judgment after the time $t_d$, the threshold value L is selected because the last judgment (at the time $t_d$) is "presence of a vehicle".

Next, time $t_e$, for example, is considered. Since the last judgment at the time $t_e$ was "presence of a vehicle" as shown in FIG. 14 (A), the threshold value L is selected, and comparing the comparison value and the threshold value L, the judgment determines "absence of a vehicle" by the following criteria: (the comparison value)<(the threshold value L).

In the next judgment after the time $t_e$, the threshold value H is selected because the last judgment (at the time $t_e$) is "absence of a vehicle". In the configuration of the system of this example, the detection time of "presence of a vehicle" is extended to a maintaining time of the detection, as in fine weather, for example, for about 115 ms, which is not illustrated in the figure. Therefore, at time $t_f$, even in the state that vehicles are momentarily absent in terms of the comparison value, the judgment is "presence of a vehicle" as shown in FIG. 14 (A).

The vehicle detection system of the present invention can precisely detect the existence of vehicle even if the detection is conducted from a side position near to the vehicles. In addition, the reduction of electricity consumption can be achieved even with continual operation of the sensor and amplifier by adopting a passive sensor consuming less electricity.

Figure 15:
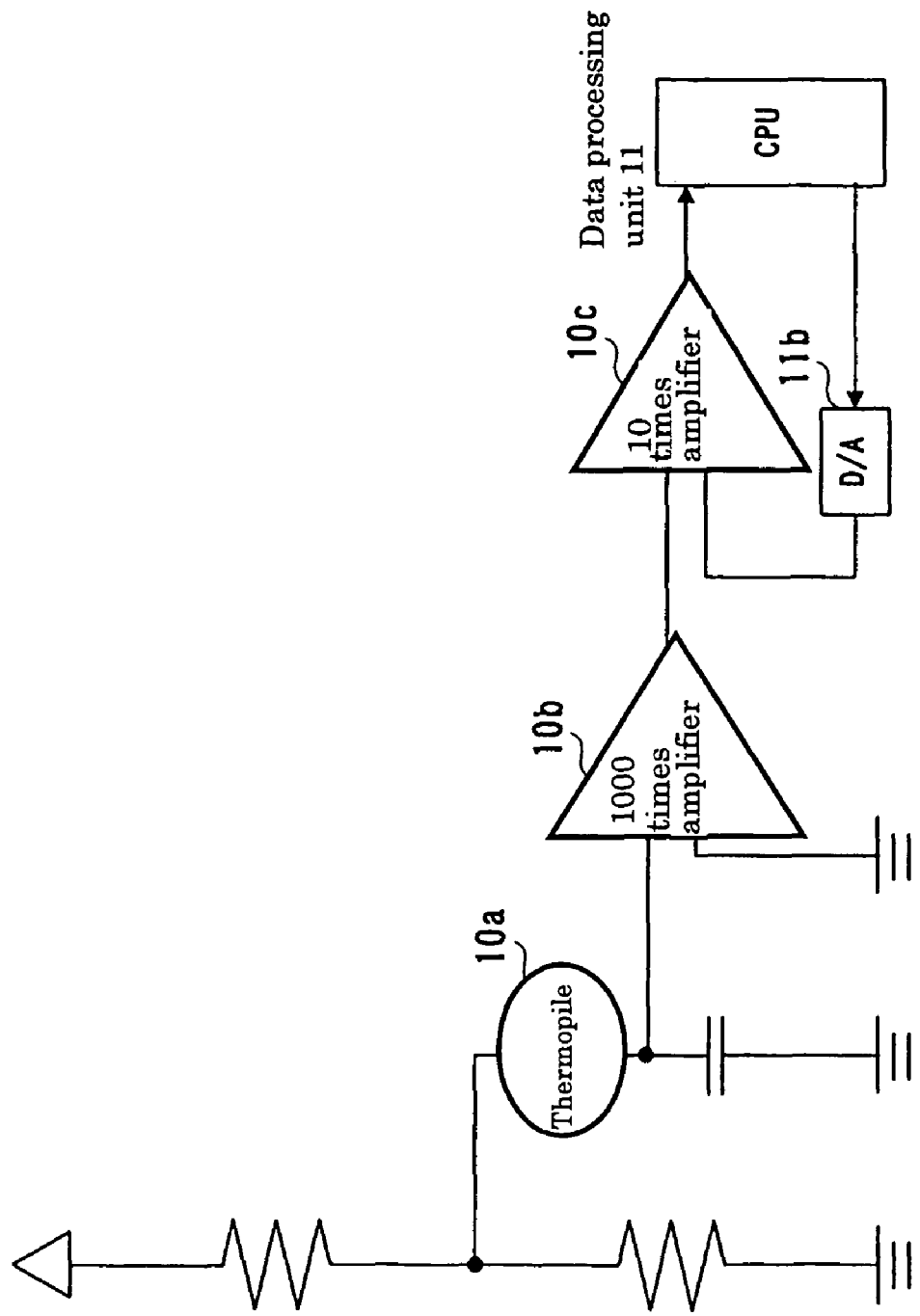
FIG. 15 is a circuit diagram schematically showing the state of the connection between a thermopile and a CPU in the vehicle detection system of the present invention.

In the above example, a large output thermopile and a value specifically calculated for use in an algorithm are adopted as described so that precision vehicle detection can be achieved even when only the thermopile is adopted in the system. In addition, the circuit configuration for the system may be devised as a detecting configuration for the precision detection. FIG. 15 is a schematic circuit diagram showing a circuit in which a thermopile is connected with a CPU in the vehicle detection system of the present invention. The thermopile 10a and the data processing unit 11 having the CPU etc. are provided in the circuit as explained earlier, and the amplifier is also provided in the circuit to amplify the electromotive force generated in the element 10a and transmit to the data processing unit 11. In this example, two amplifiers 10b and 10c are provided in the circuit as shown in FIG. 15. The amplifier 10b connected to the element 10a has a large amplification factor (1000 times in FIG. 15), and the amplifier 10c connected to the CPU has a small amplification factor (10 times in FIG. 15). The amplifier 10c connected to D/A converter 11b amplifies the difference between the outputs of the amplifier 10b and reference voltage by applying the reference voltage. By this configuration, the dynamic range of the CPU is improved, and processing can be carried out adequately. In addition, the added reference voltage may be adjusted appropriately by checking the electrical potential of the amplifier 10c. In addition, the reference voltage is adjusted by the CPU in this example.

Maintenance Method of the Vehicle Detection System

If the system is provided with a radio communication means as indicated in Examples 2 and 3, maintenance of the appropriate operation of the system of the present invention preferably carried out by radio with the radio communication means. Specifically, the maintenance is carried out by transmitting maintenance data to the transmission/reception unit in the radio communication means by maintenance equipment having a radio interface, and confirming the data resent to the maintenance equipment by operators. In this case, for example, the interface is IrDA, the maintenance equipment is a personal computer, and the resent data are data of error processing, etc. Thus, the use of radio communication means for the maintenance eliminates the necessity of installing a connection box and connectors which are necessary for the maintenance through wire, whereby the number of parts for the system can be reduced. In addition, installation and connection work for such parts is unnecessary in the system and workability in the maintenance is improved.

The maintenance of the system of the present invention by the radio communication means is carried out at the time when the power source for the radio communication means (the transmission/reception unit) is in the ON-state. If electricity is intermittently supplied to the transmission/reception unit as shown in Example 2, it is conceivable that the power source is not turned ON, that is, the power source is turned is in the OFF-state when the maintenance starts. It is preferable that for reducing power consumption of the radio communication means, the maintenance be carried out when the power source for the transmission/reception unit is in the ON-state. Thus, the present inventors propose that the radio communication means is provided with a maintenance judgment unit to determine whether the maintenance data have been received or not. The maintenance judgment unit in this example is the same CPU as described above. When the power source for the transmission/reception unit is in the ON-state, the maintenance judgment unit operates with the electric power being supplied, to determine whether maintenance data are transmitted or not. And when the maintenance data have been received, the maintenance is carried out by transmission/reception of the data. When the maintenance data have not been received, the summed-up detected results are received from the data processing unit, and are transmitted to the signal controllers and the control center.

While the maintenance data may be transmitted at any time, these data are received only during the time the power source is in the ON-state. Therefore, it is preferable that transmission time for the maintenance data is longer than the time of the ON/OFF-control cycle of the power source for the transmission/reception unit (60 seconds in Example 2) in order to allow the transmission/reception unit to receive the maintenance data without fail.

The power sources for the transmission/reception unit of a radio communication means and for the maintenance judgment unit are synchronized in the above description, but it need not be synchronized. For example, when the time of the ON/OFF-control cycle of the power source for the transmission/reception unit is longer than that for the maintenance judgment unit, and both power sources are synchronized, the maintenance efficiency may degrade. Therefore, the ON/OFF-control cycles of both power sources may be controlled separately.

Explanation of Structure of the Vehicle Detection System

Figure 16:
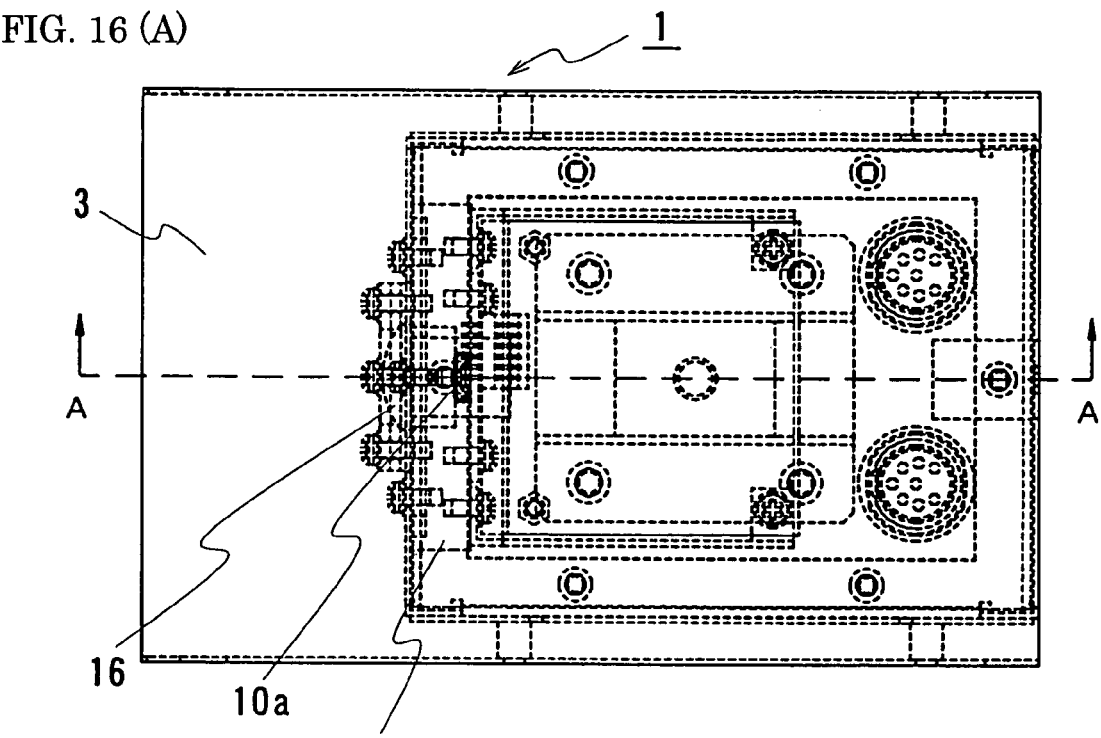
FIG. 16(A) is a front view showing a detector of the vehicle detection system of the present invention.
FIG. 16(B) illustrates an A-A cross-sectional view of the detector.
Figure 16:
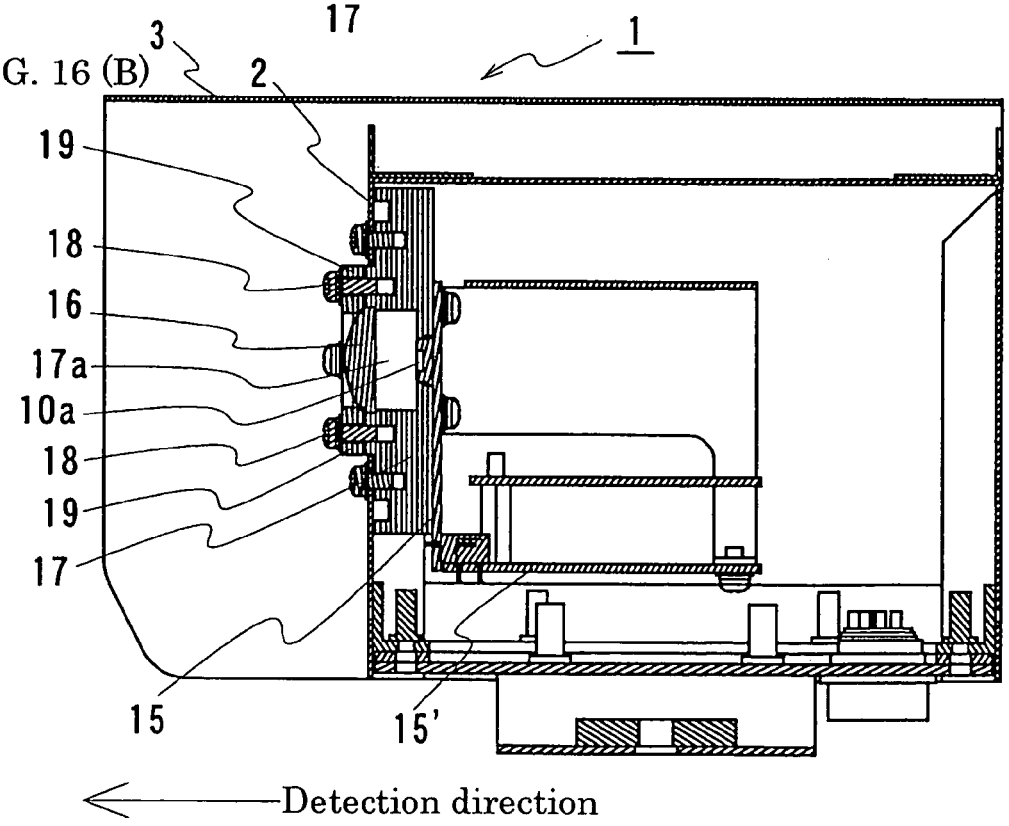
Figure 17:
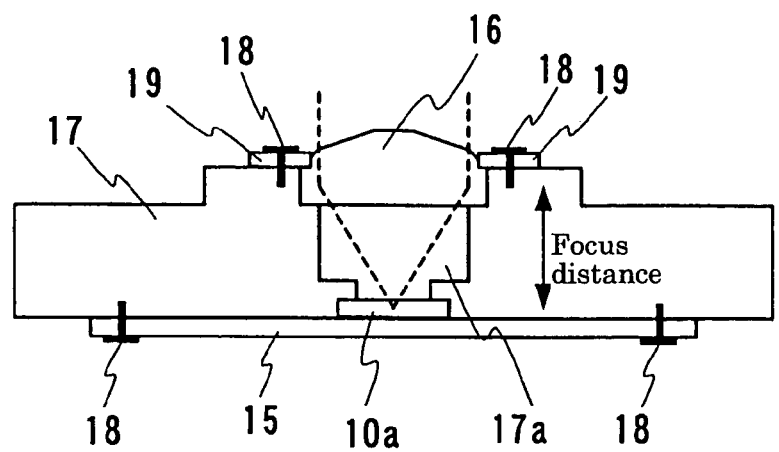
FIG. 17 is a schematic enlarged view showing a lens part in the detector of the vehicle detection system of the present invention.

The mechanical structure of the vehicle detection system of the present invention is explained as follows:

FIG. 16 (A) is a front view showing the detector of the system of the present invention, FIG. 16 (B) illustrates A-A cross-sectional view, and FIG. 17 is an enlarged schematic figure showing a cross-sectional lens area. A detector 1 illustrated in FIG. 16 is provided with a thermopile 10a and a CPU substrate 15', wherein the thermopile 10a is as a sensor for detecting infrared radiation irradiated from an object and the CPU substrate 15' is used for the vehicle presence judgment means to determine the presence of a vehicle by using an input level value detected by the thermopile 10a.

The detector 1 in this example houses the thermopile 10a in a housing box 2 as shown in FIG. 16. The thermopile 10a mounted on a base plate 15 is provided in the housing box 2. The base plate 15 is connected to the CPU substrate 15' with connectors, etc.

In this example, the housing box 2 is a lightweight aluminum case, on which an aiming mechanism is provided as described below. In addition, the detector 1 illustrated in FIG. 16 has a configuration such that a cover 3 is provided over the outer surface of the housing box 2.

In this example, infrared transparent lens 16 is placed in front of the thermopile 10a relative to the detection direction (left side, in FIG. 16 (B)) such that one surface of the lens (a spherical surface in FIG. 16 (B)) is exposed. In this example, the lens is made of zinc sulfide (ZnS) having a spherical surface shape. Since the lens made of ZnS has superior weatherability, the provision of supplemental materials such as glass-type or silicon-type lenses is unnecessary.

The thermopile 10a and the infrared transparent lens 16 are supported by supporting unit 17 and placed in the housing box 2. The supporting unit 17 supporting both the thermopile 10a and the infrared transparent lens 16 as shown in FIG. 17 is formed in one body. A space is formed in the supporting unit 17 in a suitable manner such that the thermopile 10a and the infrared transparent lens 16 can be positioned with an appropriate focus distance when the element 10a and the infrared transparent lens 16 are mounted. Therefore, the focus distance is automatically adjusted when the thermopile 10a and the infrared transparent lens 16 are mounted at a designated mounting place of the supporting unit 17. Since the focus distance can easily be adjusted by using such supporting unit to which the thermopile 10a and the infrared transparent lens 16 are mounted and the supporting unit can be mounted to the housing box 2 without any adjustments, excellent workability can be achieved in their mounting work. In this example, the base plate 15 on which the thermopile 10a is mounted is fixed to the supporting unit 17 by screws 18 after it is placed appropriately on the supporting unit 17. The infrared transparent lens 16 is fixed to the supporting unit 17 by the screws 18 through a lens fixing plate 19.

Figure 18:
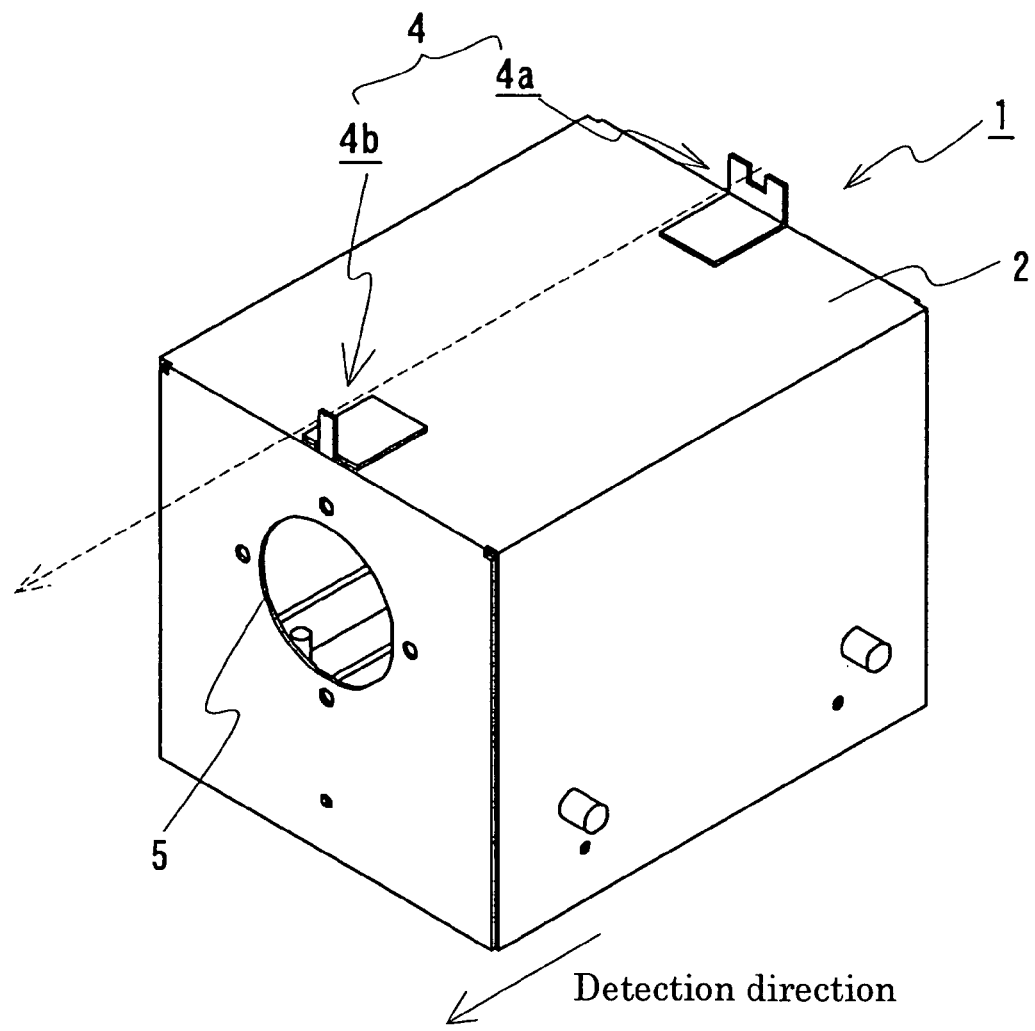
FIG. 18 is a perspective view schematically showing the detector of the vehicle detection system of the present invention.

FIG. 18 is a perspective view showing an outline of the detector used in the vehicle detection system of the present invention. As shown in FIG. 18, an aiming unit 4 for adjusting an angle of an infrared transparent lens to the direction of an object is provided at the outside of housing box 2 of the detector 1 so that the aiming unit can easily direct the directional angle of the infrared transparent lens (see FIG. 17) to the object. In this example, a concave projection 4a is provided at one end of one surface of the housing box 2, and a convex projection 4b is provided at the other end of the same surface. These projections 4a and 4b are provided such that a concave part of the concave projection 4a and a convex part of the convex projection 4b are aligned in an appropriate direction so that the directional angle can be directed to the object. Therefore, when installing the detector 1 on a supporting pole as described below, a person involved in the installation can adjust an installation position, while observing the convex projection 4b from the concave part of the concave projection 4a, so that a straight line connecting the concave projection 4a and a convex part of the convex projection 4b is directed to the directional angle. In FIG. 18, a circular hole 5 provided in a surface of the housing box 2 (left surface, in FIG. 18) is used for placing the infrared transparent lens to be projected. The detector illustrated in FIG. 18 is in the uncovered state.

Application Example

Detection of Vehicles Running on One Traffic Lane

An application example of the vehicle detection system of the present invention is explained as follows.

FIG. 19 is a schematic diagram illustrating a state in which a detector for the vehicle detection system of the present invention is installed on a supporting pole at the side of the road; FIG. 19 (A) is an example where a sensor and a vehicle presence judgment means are provided integrally in the detector, and FIG. 19 (B) is an example where they are provided separately. The detector 1, which is structured such that the thermopile 10a as the sensor described above and the data processing unit 11 for judging the presence of a vehicle are both put in the housing box 2, detects vehicle presence with a series of the processing procedures explained in the above examples when the housing box 2 is installed on a supporting pole 200 as shown in FIG. 19 (A). A detector 1', which is configured such that only the thermopile 10*a* is housed in the housing box 2 and the data processing unit 11 is housed in a control box 14, detects vehicle presence with a series of the processing procedures also explained in the above examples, when the housing box 2 is installed at the upper part of the supporting pole 200 and the control box is installed at the lower part of the supporting pole 200 as shown in FIG. 19 (B). In addition, it is preferable that a radio communication unit be provided in the control box 14 when the summed-up detected results are not transmitted by a cable. In FIG. 19 (A), the radio communication unit 13 is equipped at the upper part of the supporting pole 200 so that radio communication may not be obstructed, and also cables for connecting the data processing unit 11 and a solar cell unit 12 etc. can be shortened. However, it may be housed in the housing box 2. In addition, the solar battery unit 12 for power supply to the thermopile 10*a* and the data processing unit 11, etc. is installed at an upper part of the supporting pole 200 in the examples of FIGS. 19 (A) and 19 (B).

The housing box 2, which houses the thermopile 10*a*, is disposed at a side position of a road 201 as shown in FIGS. 19 (A) and 19 (B), detects infrared radiation irradiated from vehicle 203 and the road. More specifically, the housing box 2 is placed so as to be slanted at an angle to the direction along the axis of the supporting pole 200 near the road 201 in order that the width W of a monitoring range 202 on the road 201 (a rectangular part surrounded by broken lines in FIG. 19) be a desired size (1.2 m in this example) at a desired height (about 5.5 m in this example) from the road 201. It is preferable that the aiming mechanism in the detector as described above be provided for easy adjustment of the directional angle of the infrared transparent lens to the direction of the object. Such installation allows the thermopile 10*a* in the housing box 2 to detect, from the side of the road 201, physical quantities irradiated from the vehicles, etc., while the conventional ultrasonic wave detector performs such detection from approximately just above the road. However, the detectors 1 and 1' of the present invention having the sensor detecting the infrared radiation can achieve vehicle detection with less misdetection of vehicles and with less power consumption compared with conventional ultrasonic detectors even if the detectors are installed at the side of a road. In particular, a vehicle stopped by traffic jams can be precisely detected by using the thermopile for detecting the infrared radiation as described above.

When the system of the present invention has one thermopile, vehicles running on one traffic lane can be detected. Therefore, when the housing box housing a sensor is installed, for example, on a pole so as to detect vehicles in plural lanes, any vehicle running in any traffic lane can be detected from the side of the road.

Detection of Vehicles Running Plural Traffic Lanes ①

The detection of vehicles running in one traffic lane at a monitoring time was explained in the above description. Next, the detection of vehicles running in plural traffic lanes at a monitoring time is explained.

Figure 20:
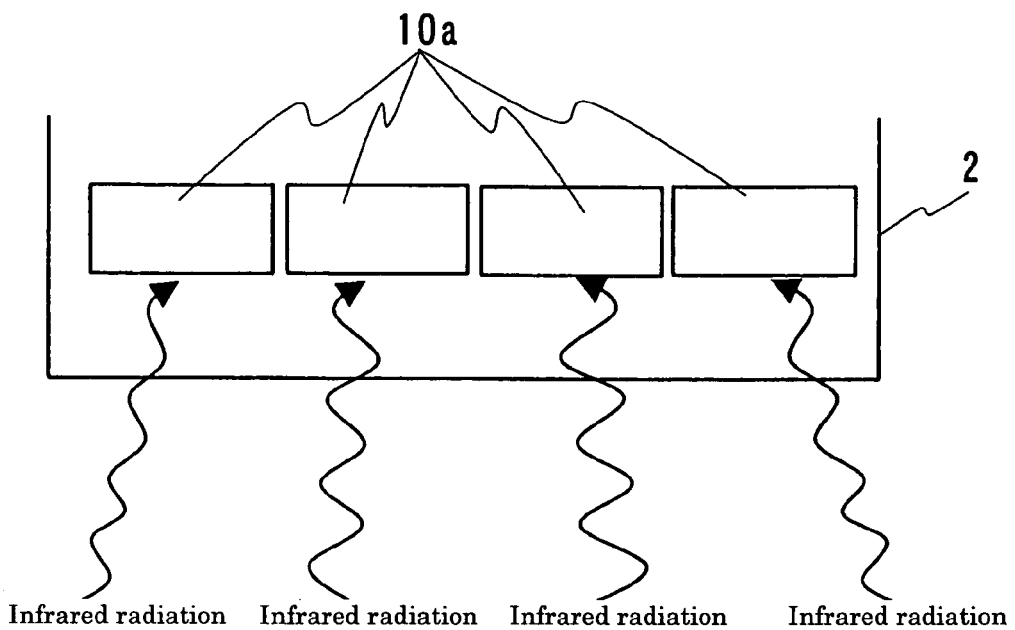
FIG. 20 is a schematic enlarged cross-sectional view of a part of the detector including plural thermopiles.
Figure 21:
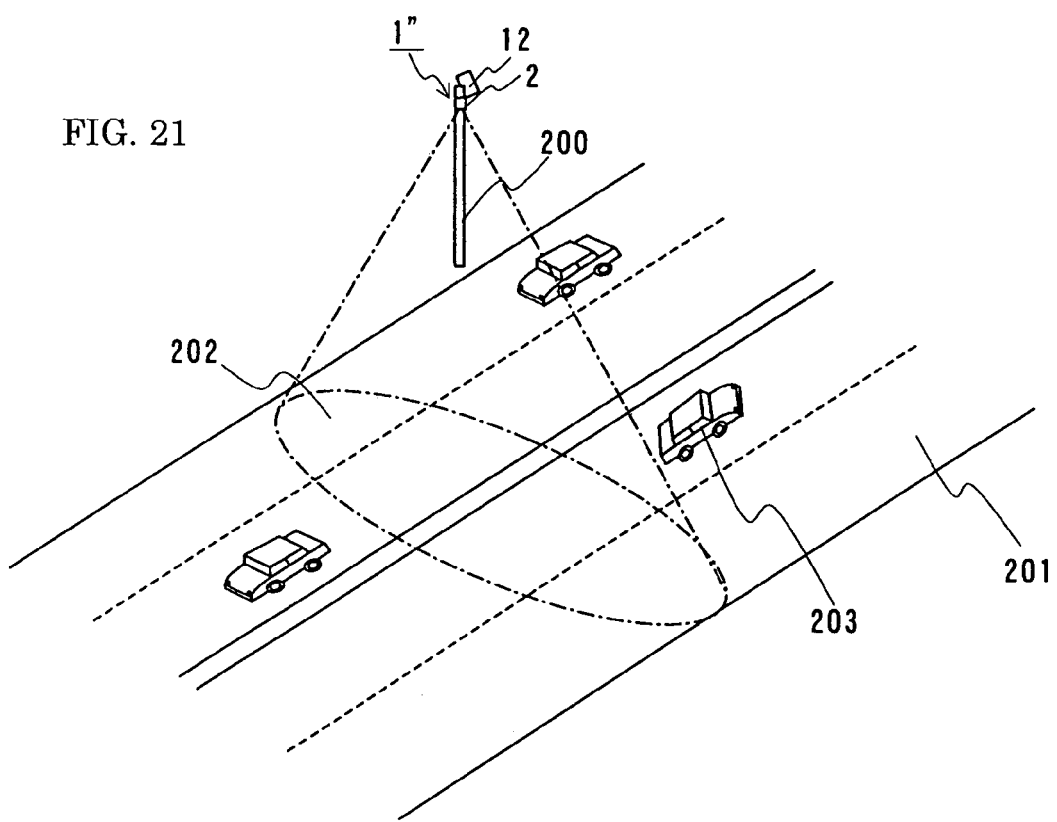
FIG. 21 illustrates a monitoring range of the detector having plural thermopiles.

FIG. 20 is an enlarged schematic diagram of a part of the detector of the system of the present invention having a plurality of thermopiles, and FIG. 21 is an figure showing a monitor range of the detector. For watching plural traffic lanes, it is preferable to have plural thermopiles 10*a* in the housing box 2 as shown in FIG. 20. The infrared radiation irradiated from the vehicles running on plural traffic lanes can be detected separately by each thermopile 10*a* disposed at a shifted position in the housing box 2. The detector 1" can detect plural vehicles in a monitoring range (an elliptical part described by a broken chain line in FIG. 21), and vehicles detection of plural traffic lanes can be achieved by installing one housing box at the side of a road. Therefore, since the detector 1" no longer needs the horizontal bar required for the conventional ultrasonic detector (cf. FIG. 21), the aesthetic beauty is not degraded.

Detection of Vehicles Running Plural Traffic Lanes ②

Figure 22:
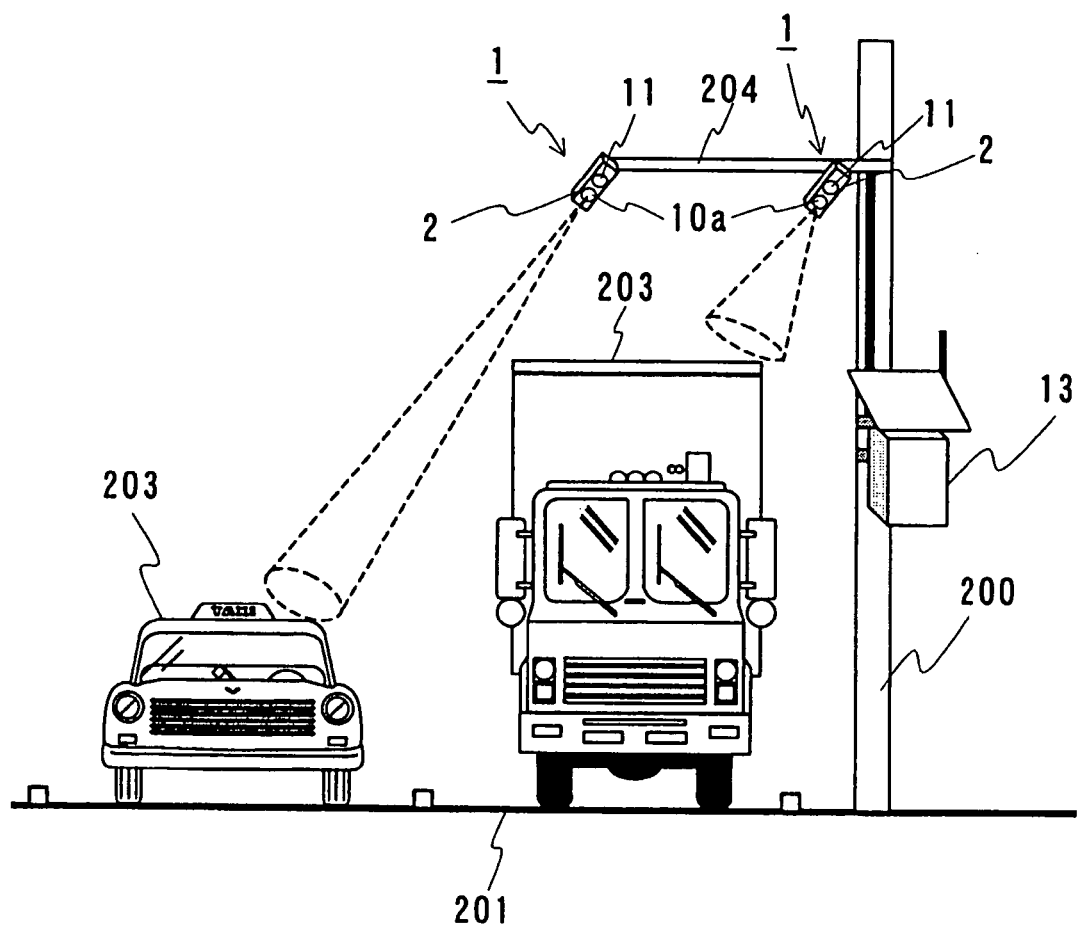
FIG. 22 illustrates a state in which detectors are placed one for each of plural traffic lanes, wherein each detector has one thermopile.

The detector having plural sensors (thermopiles in the above example) in one housing box was explained in the above description, but a suitable number of plural boxes each having one sensor may be installed according to the number of traffic lanes. FIG. 22 is an explanatory figure showing the state in which plural detectors each having one thermopile are provided for the respective plural traffic lanes. In the case where the detector having plural sensors in one housing box is installed in the so-called side-fire configuration as shown in FIG. 21, when a large vehicle runs on a traffic lane nearest to the installation place of the housing box 2 and a small vehicle runs on a traffic lane to the far side of the installation place of the housing box 2, the infrared radiation irradiated from the small vehicle may not be detected, since the small vehicle is obstructed by the large vehicle. In such a case, one of plural detectors having one thermopile 10*a* in one housing box 2 may be equipped for each lane, respectively. It is preferable that each housing box 2 is fixed to a horizontal bar 204 supported by the supporting pole as shown in FIG. 22. The horizontal bar 204 may be comparatively short as the detector 1 can, even sideways of vehicles, satisfactorily detect the infrared radiation irradiating from vehicles. Specifically, it is sufficient if the horizontal bar has a length suitable for the detector 1 to be placed not virtually just above the vehicle 203 but slanting above the vehicle 203 as shown in FIG. 22.

INDUSTRIAL APPLICABILITY

According to the vehicle detection system of the present invention using a sensor to passively detect the infrared radiation irradiated from an object to be detected, superior effects such as less misdetection and high precision detection of the presence of a vehicle can be achieved. Particularly, since the system uses a sensor passively to detect the infrared radiation irradiated from an object to be detected, the system consumes less electricity as compared with a system using an active sensor to detect the infrared radiation emitted from the sensor itself such as a conventional ultrasonic detector, and can be operated adequately even by a solar battery or the like. Therefore, the system of the present invention has not only good workability with simple and easy installation, but is also more economical compared with systems having power supply facilities that supply electricity through a cable and so on. In addition, electricity consumed by the system can be further reduced and a low cost system can be achieved, since the system can perform detection at a very short time, which allows the sensor to be operated intermittently.

In the case where a radio transmission means for transmitting judgment results of a vehicle presence is provided in the system of the present invention, power consumption for transmitting data, etc. can be further reduced by intermittently supplying electricity. In addition, the system maintenance method of the present invention using a radio communication means allows the facilities to be simplified and hence improve workability as compared with maintenance using a cable.

Particularly in the case where electricity is supplied intermittently to the radio transmission means, further reduction of the power consumption can be achieved if the maintenance is carried out only when the power source is in the ON-state.

In addition, as the vehicle detection system of the present invention has precision detection capabilities, vehicles can be detected satisfactorily even if the detection is made from the side of the road, unlike a conventional system installed at a horizontal bar to detect from a position approximately perpendicular above the road. Therefore, the system of the present invention will have a wider scope of application than the conventional system since the former does not need a long horizontal bar for installation and consequently has liberal installation conditions as compared with the latter that needs a long horizontal bar for installation. Also, the system of the present invention does not degrade the town's aesthetic beauty nor require high installation cost as compared with the conventional systems since the former can be installed without such a long horizontal bar as needed by the latter.

The invention claimed is:

1. A vehicle detection system for detecting a vehicle running through a monitoring range on a road, comprising:
    a sensor detecting infrared radiation irradiated from an object to be detected;
    a background level calculation means that (a) defines the intensity of current infrared radiation detected by the sensor as an input level value, (b) defines a value based on the intensity of infrared radiation emitted by objects other than vehicles as a background level value, and (c) calculates and renews the background level value in accordance with the last result of a vehicle presence judgment by using the input level value; and
    a vehicle presence judgment means that (a) defines a value based on the difference between the input level value and the background level value as a comparative value and (b) determines the presence of the vehicle when the comparative value exceeds a threshold value,
    wherein a value defined by adding a modification value to a set value is used as the threshold value and the modification value is changed depending on the last result of the vehicle presence judgment.

2. A vehicle detection system according to claim 1, wherein said sensor consists of only one kind of a thermopile.

3. A vehicle detection system according to claim 2, wherein a housing box for housing the thermopile is provided, said housing box having an aiming unit for adjusting a directional angle of the infrared transparent lens to a direction towards the object.

4. A vehicle detection system according to any one of claims 1 and 2, wherein said comparative value is an integrated value of the differences between the input level value and the background level values integrated during a predetermined time.

5. A vehicle detection system according to claim 4, wherein a variation of the input level value per unit time is taken into consideration in said comparison value.

6. A vehicle detection system according to claim 5, wherein the threshold value is calculated and renewed successively in accordance with environments.

7. A vehicle detection system according to claim 6, wherein an infrared transparent lens made of zinc sulfide is placed in front of the thermopile relative to a direction towards the object.

8. A vehicle detection system according to claim 7, wherein a supporting unit is formed for supporting the thermopile and the infrared transparent lens together in one body.

9. A vehicle detection system according to claim 1, wherein a radio communication means is provided for transmitting by radio the results supplied from the vehicle presence judgment means.

10. A vehicle detection system according to claim 9, wherein a power source control unit is provided for intermittently supplying electricity to said radio communication means.

11. A method of maintenance for the vehicle detection system according to claim 9 or 10, wherein the maintenance is carried out by transmitting maintenance data to said radio communication means by radio.

12. A method of maintenance for the vehicle detection system according to claim 11, wherein said radio communication means is provided with a maintenance judgment unit to determine the reception of said maintenance data such that said maintenance judgment unit determines the reception of said maintenance data when the power source for said radio communication means is in the ON-state, and the maintenance of said vehicle detection system is performed only when said maintenance data has been received.

* * * * *